United States Patent
Na et al.

(10) Patent No.: US 9,303,298 B2
(45) Date of Patent: *Apr. 5, 2016

(54) POROUS $UO_2$ SINTERED PELLET FOR ELECTROREDUCTION PROCESS, AND PREPARATION METHOD THEREOF

(71) Applicant: KOREA ATOMIC ENERGY RESEARCH INSTITUTE, Daejeon (KR)

(72) Inventors: Sang-Ho Na, Daejeon (KR); Dae-Yong Song, Chungcheongbuk-do (KR); Ki Hong Kim, Daejeon (KR); Sang-Oh Bae, Daejeon (KR); Jong-Man Park, Daejeon (KR); Chul Goo Ji, Daejeon (KR); Hyong Jin Hwang, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 237 days.

This patent is subject to a terminal disclaimer.

(21) Appl. No.: 13/865,786

(22) Filed: Apr. 18, 2013

(65) Prior Publication Data

US 2014/0093733 A1    Apr. 3, 2014

(30) Foreign Application Priority Data

May 31, 2012    (KR) .................. 10-2012-0058048

(51) Int. Cl.
| | |
|---|---|
| *G21C 21/00* | (2006.01) |
| *C22B 60/02* | (2006.01) |
| *C01G 43/025* | (2006.01) |
| *G21C 3/62* | (2006.01) |
| *C01G 43/01* | (2006.01) |

(52) U.S. Cl.
CPC ............ *C22B 60/0208* (2013.01); *C01G 43/01* (2013.01); *C01G 43/025* (2013.01); *G21C 3/623* (2013.01); *G21C 21/00* (2013.01); *C01P 2004/61* (2013.01); *C01P 2006/12* (2013.01); *Y02E 30/38* (2013.01); *Y10T 428/2982* (2013.01)

(58) Field of Classification Search
None
See application file for complete search history.

(56) References Cited

U.S. PATENT DOCUMENTS

| | | | |
|---|---|---|---|
| 4,994,233 A * | 2/1991 | Freeman ................. | 376/428 |
| 6,251,310 B1 * | 6/2001 | Song ..................... | G21C 21/00 264/0.5 |
| 2002/0005597 A1 * | 1/2002 | Larson et al. ........... | 264/0.5 |
| 2008/0185743 A1 * | 8/2008 | Yang et al. .............. | 264/5 |
| 2013/0148774 A1 * | 6/2013 | Na et al. ................. | 376/409 |
| 2013/0175719 A1 * | 7/2013 | Na et al. ................. | 264/5 |

FOREIGN PATENT DOCUMENTS

| | | |
|---|---|---|
| JP | 2000314790 A | 11/2000 |
| KR | 1020000019009 A | 4/2000 |
| KR | 1020110000874 A | 1/2011 |
| KR | 1020110024931 A | 3/2011 |

* cited by examiner

*Primary Examiner* — Mary F Theisen
(74) *Attorney, Agent, or Firm* — Fredrikson & Byron P.A.

(57) ABSTRACT

Porous $UO_2$ sintered pellets to be fed into an electrolytic reduction process for the purpose of metallic nuclear fuel recovery, include one or more hollow spaces formed from the surfaces toward the interiors thereof. When the porous $UO_2$ sintered pellets are used in the electrolytic reduction process, the efficiency increases.

18 Claims, 27 Drawing Sheets

<sintered pellet>

EXAMPLE 5

EXAMPLE 6

COMPARATIVE EXAMPLE 6

EXAMPLE 7

COMPARATIVE EXAMPLE 7

EXAMPLE 8

COMPARATIVE EXAMPLE 8

POROUS UO₂ SINTERED PELLET FOR ELECTROREDUCTION PROCESS, AND PREPARATION METHOD THEREOF

CROSS-REFERENCES TO RELATED APPLICATION

This application claims priority from Korean Patent Application No. 10-2012-0041411, filed on Apr. 20, 2012, and Korean Patent Application No. 10-2012-0058048, filed on May 31, 2012, in the Korean Intellectual Property Office, the contents of which are incorporated herein by reference in its entirety.

BACKGROUND OF THE INVENTION

1. Field of the Invention

The present invention relates to a method for fabricating porous $UO_2$ sintered pellets for recovering metallic nuclear fuel, and a fabrication method thereof.

2. Description of the Related Art

Spent nuclear fuel ($UO_2$) from a light water reactor (LWR) generally includes fissile material (U) that is not consumed, and transuranic elements (TRU) that are generated from the burning. Along with this, $UO_2$ also includes fission products. The pyroprocess is a recycling technology implemented to produce metallic nuclear fuel for use in a fast reactor, through pyrometallurgical and electrochemical processing from irradiated $UO_2$ fuel in the LWR, thus providing advantages including good nuclear proliferation resistance. To recover the fissile material, the pyroprocessing mainly includes a pretreatment process to fabricate $UO_2$ sintered pellets from $U_3O_8$ powder, and a follow-up process to convert the fabricated $UO_2$ sintered pellets (i.e., ceramic nuclear fuel) into metallic nuclear fuel. The presence of fission products is desirably removed in the pretreatment process an consideration of the considerable influence on the follow-up process where the ceramic fuel is converted into metallic fuel.

To be specific, the pretreatment process generally involves the disassembly/cutting of a fuel rod, decladding, compacting, and sintering, and the follow-up process mainly involves an electrolytic reduction, electro-refining, and electro-winning. The decladding in the pretreatment process relates to extracting spent $UO_2$ sintered pellets from the disassembly/cut fuel rod, in which the $UO_2$ sintered pellets within the fuel rod are generally converted into $U_3O_8$ in an air atmosphere at temperatures ranging between 350 and 700° C. The $UO_2$ pellets are powdered owing to a volume expansion in accordance with the decreased density, and thus escape from the fuel rod. As the phase changes from $UO_2$ pellets to $U_3O_8$ powder from oxidation, gaseous volatile fission products including iodine (I) and bromine (Br) existing in the pellet are vaporized.

After the decladding, the $U_3O_8$ powder is compacted into the desired shapes and dimensions using a compacting machine such as a press. Then, by sintering at the appropriate temperature under the desired atmospheric gas (e.g., oxidising, inert, nitrogen, and reducing atmospheric gas), porous sintered pellets are fabricated, and are suitable for a volatilization of the fission products and are suitable for handling. Porous $UO_2$ sintered pellets are advantageous, considering the fact that fission products are easily vaporised, and when the following electrolytic reduction is processed with $UO_2$ rather than $U_3O_8$, the O/U ratio is decreased from 2.67 to 2.00, and owing to the decrease in the existing oxygen, the processing efficiency is increased greatly. Further, the process yield is increased, such that there is an advantage of increased productivity.

Korean Patent No. 10-0293482, incorporated herein by reference in its entirety, teaches a method for fabricating $UO_2$ sintered pellets, which includes steps of fabricating green pellets by adding various kinds of sintering aids into oxidized $U_3O_8$ powder transformed from $UO_2$ spent nuclear fuel, and fabricating $UO_2$ sintered pellets by sintering the green pellets at temperatures above or equal to 1500° C. in a reducing atmosphere, thereby providing the advantage of providing $UO_2$ sintered pellets with high sintered density.

Further, Korean Patent No. 10-1020783 discloses a method for fabricating porous granule from spent nuclear fuel, which includes steps of preparing fine $U_3O_8$ powder by charging the spent nuclear fuel into voloxidizer apparatus, where the fuel is rotated and annealed under oxidation condition at 450° C. to 600° C., preparing $U_3O_8$ powder and metallic oxides by additionally annealing the fine $U_3O_8$ powder and the metallic fission products while rotating these under an oxidation condition of 700° C. to 800° C., and preparing porous $UO_{2+z}$ granule by additionally annealing $U_3O_8$ powder under an inactive condition of 1000° C. to 1300° C. while rotating the $U_3O_8$ powder.

Meanwhile, conventionally, porous $UO_2$ sintered pellets for an electrolytic reduction for recovering metallic fuel is in a cylindrical shape, and such cylindrical sintered pellets require sufficient time to ensure that fission products are volatized during atmospheric sintering and reduction.

Further, for the collar-shaped $UO_2$ sintered pellets to be electro-reduced into metallic fuel (U & TRU), it is necessary that molten salt, which is one of the electrolytic substances, infiltrate into the $UO_2$ sintered pellets through the pores existing on the surface thereof. It takes a considerable amount of time until the molten salts infiltrate into the sintered pellet, and difficulty of molten salt infiltration into an interior of the pellets during an electrolytic reduction often causes imperfect an electrolytic reduction efficiency.

Accordingly, to prevent the shortcomings mentioned above, the $UO_2$ sintered pellets are sized to have loss diameter and longer length. However, this requires more caution in the process of fabricating and handling the sintered pellets, and even affects throughput and economic aspect.

Additionally, it is reported that uranium dioxide ($UO_2$), the spent nuclear fuel of the pressurised water reactor (PWR), has a varying burnup distribution depending on the length thereof, even in the same fuel assembly and fuel rod. That is, the burnup at the beginning and ending portions of the fuel rod are relatively smaller, while the middle portion has foe greater burnup. Such differences in the burnup distribution cause an irregular distribution of the contents depending on the composition of the fissile material (i.e. U, TRU) generated within nuclear fuel, and fission product, and can also influence the microstructure of the nuclear fuel.

The size of the grains of the microstructure of the nuclear fuel varies depending on the burnup or linear heat racing, and based on one burnup and in the direction from the edge to the center axis, the $UO_2$ sintered pellets can be divided ante an undistributed area before irradiation, i.e., an equiaxed area and a columnar area. The varying particle sizes depending on the burnup also influences the particle size of the oxidized $U_3O_8$ powder, and the particle size of the oxidized powder also tends to increase, when the burnup increases.

Such difference in burnups, i.e., the inhomogeneous distribution of TRU concentration containing plutonium and irregular particle since, can affect the accuracy in the metric measurement of nuclear fuel substances, which can greatly contribute to nuclear transparency. Without an accurate measurement of nuclear fuel substances, it would be difficult to achieve stability of processing factors and reproducibility in the fabrication of porous $UO_2$ sintered pellets.

Accordingly, while continuing with studies on a method for fabricating porous $UO_2$ sintered pellets for an electrolytic reduction, the inventors of the present invention were able to develop a method for fabricating porous $UO_2$ sintered pellets, which can resolve the problems occurring in the prior art, and thus completed the present invention.

SUMMARY OF THE INVENTION

The objective of the present invention is to provide a method for fabricating porous $UO_2$ sintered pellets for the electrolytic reduction process for the purpose of recovering metallic nuclear fuel.

In one embodiment, porous $UO_2$ sintered pellets to be fed into an electrolytic reduction process for the purpose of metallic nuclear fuel recovery, are provided, in which the porous $UO_2$ sintered pellets may include one or more hollow space formed from the surfaces toward the interiors thereof.

In one embodiment, a method for fabricating porous $UO_2$ sintered pellets to be fed into an electrolytic reduction process for the purpose of metallic nuclear fuel recovery is provided, which may include steps of forming a powder containing $U_3O_8$ by oxidizing spent nuclear fuel containing uranium dioxide ($UO_2$) (step 1), compacting the powder formed in step 1 into green pellets with hollow spaces formed therein (step 2), and fabricating the porous $UO_2$ sintered pellets by sintering the green pellets fabricated in step 2 and reducing the same in a reducing atmospheric gas (step 3).

In another embodiment, a method for fabricating porous $UO_2$ sintered pellets to be fed into an electrolytic reduction process for the purpose of metallic nuclear fuel recovery is provided, which may include steps for; forming powder containing $U_3O_8$ by oxidizing spent nuclear fuel containing uranium dioxide ($UO_2$) (step 1); homogenizing the powder formed in step 1 (step 2); fabricating green pellets by compacting the powder homogenized in step 2 (step 3), and fabricating the porous $UO_2$ sintered pellets by sintering the green pellets fabricated in step 3 and reducing the same in a reducing atmospheric gas (step 4).

Compared to conventional cylindrical porous sintered pellets, porous $UO_2$ sintered pellets according to the present invention have an increased surface area to react externally, and owing to such increased surface area, the pores formed on the surfaces also increase to facilitate the release of volatile and semi-volatile nuclear fission products from the surface of the spent nuclear fuel during atmospheric sintering and reduction.

Furthermore, owing to an increased surface area, sintering can be achieved at a lower sintering temperature than required for the electrolytic reduction process, and the temperature and duration to reach a 2.00 O/U ratio during the reduction can also be reduced.

Furthermore, since contact between sintered pellets and electrolytes increases during the electrolytic reduction process and the depth for the electrolyte to infiltrate into the sintered pellets is shorter, the efficiency of the electrolytic reduction increases, and as the depth for the electrolyte to infiltrate shortens, the diameter of the sintered pellets can be increased compared to conventional porous $UO_2$ sintered pellets, thus compensating for the effect from a reduced weight.

Furthermore, an accurate metric measurement for a fissile material is provided, since the concentration distribution of the nuclear fissile material variably present in spent nuclear fuel is regularized by the fabricating method according to the present invention, and since the concentration distribution of the nuclear fissile material present in the spent nuclear fuel is regularized, the ability to capture a fission product vaporizing during sintering and reduction, along with reproducibility of the processes for the fabrication of sintered pellets, is achieved. Furthermore, increased productivity is provided, as it is enabled to fabricate sintered pellets with the desired sintered density even under a relatively lower compaction pressure or sintering temperature, thanks to the variation of the powder characteristics by the homogenization.

BRIEF DESCRIPTION OF THE DRAWINGS

The above and/or other aspects and advantages of the present invention will become apparent and more readily appreciated from the following detailed description, taken in conjunction with the accompanying drawings.

DETAILED DESCRIPTION OF THE INVENTION

Figure 1:
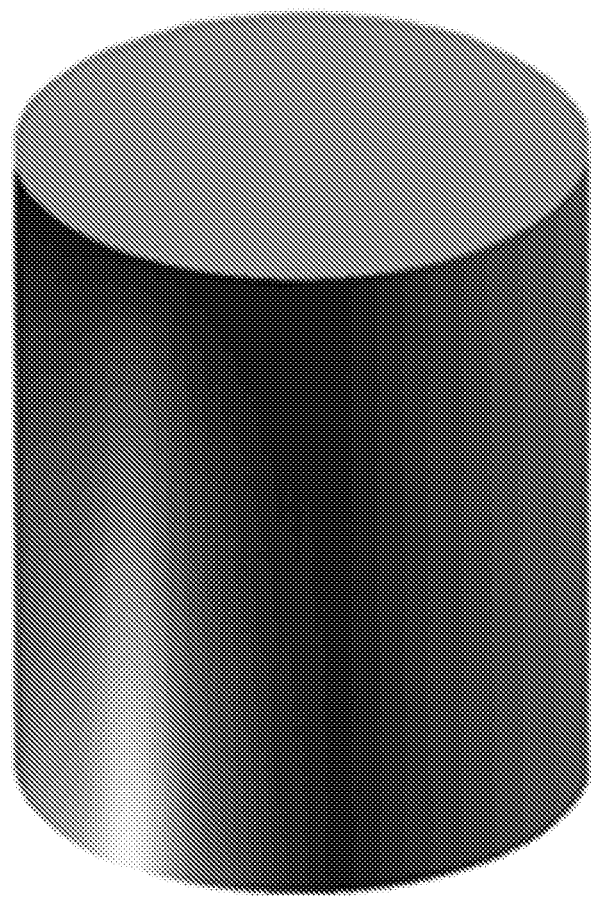
FIG. 1 shows a general porous $UO_2$ sintered pellet in a pillar shape.

Reference will now be made in detail to the embodiments of the present, invention, the examples of which are illustrated in the accompanying drawings, wherein, like the reference numerals, refer to the like elements throughout. The embodiments are described below to explain the present invention by referring to the figures.

In one embodiment, a porous $UO_2$ sintered pellet to be used in the electrolytic reduction for the purpose of recovering metallic nuclear fuel has one or more hollow spaces formed inwardly from a surface of the sintered pellet, and provides improved efficiency of the electrolytic reduction.

In one embodiment, the hollow spaces extend inwardly from the surface of the sintered pellet to increase the area of contact with the electrolyte (i.e., molten salts) and decrease the depth of infiltration by the electrolyte during the electrolytic reduction.

Referring to FIG. 1, conventional cylindrical-shaped porous $UO_2$ sintered pellet has a limited contact area with the electrolyte during the electrolytic reduction and requires a lengthy time for the electrolytic reduction until the electrolyte infiltrates into the sintered pellet. Further, depending on the case, the efficiency of electrolytic reduction can deteriorate as the electrolyte does not infiltrate into the sintered pellet.

The present invention solves the above problem occurring in the prior art, by providing a porous $UO_2$ sintered pellet having hollow spaces formed therein, extending inwardly from a surface of the porous $UO_2$ sintered pellet, thereby increasing the surface area of the porous $UO_2$ sintered pellet. As the surface area increases, contact area with the electrolyte increases. Accordingly, a more efficient an electrolytic reduction is provided, and since the electrolyte infiltrates to a shorter depth, the electrolytic reduction can be done in a shorter amount of time. Furthermore, since the electrolyte infiltrates to a shorter depth, a sintered pellet, which is larger in size than a conventional porous $UO_2$ sintered pellet, can be used, and as a result, a reduction of the weight of the sintered pellet from the presence of the hollow spaces can be compensated.

A porous $UO_2$ sintered pellet according to one embodiment may be fabricated into a predetermined shape to suit the follow-up electrolytic reduction and provide convenience of handling and simplification of the fabrication process, although not limited to any specific shape. For example, the porous up sintered pellet may be configured into a cylindrical or polygonal shape.

Further, although not limited to any specific number, there may be one or more hollow spaces, considering the strength of the sintered pellet, convenience of handling, and simplification of the fabrication process.

Furthermore, the hollow spaces may be connected to each other and passed through the porous $UO_2$ sintered pellet. By way of an example, the hollow spaces may be passed through the porous $UO_2$ sintered pellet in a lengthwise direction. However, the hollow spaces may not be limited to any specific shape or structure, and various shapes and structures of hollow spaces may be formed in a porous $UO_2$ sintered pellet.

Meanwhile, the volume ratio of hollow apace to a porous $UO_2$ sintered pellet may preferably range between 2 and 30%.

The efficiency of an electrolytic reduction has to be considered when forming one or more hollow spaces. The electrolytic reduction speed of each sintered pellet increases as the volume ratio of the hollow spaces increases. However, the total amount of used nuclear fuel pellets that can be processed at once may decrease. Accordingly, the hollow spaces may preferably be formed with a volume ratio of 2 to 30% with respect to a porous $UO_2$ sintered pellet, according to which the speed and efficiency of the electrolytic reduction is improved, and the integrity of the sintered pellet is also maintained.

Figure 2:
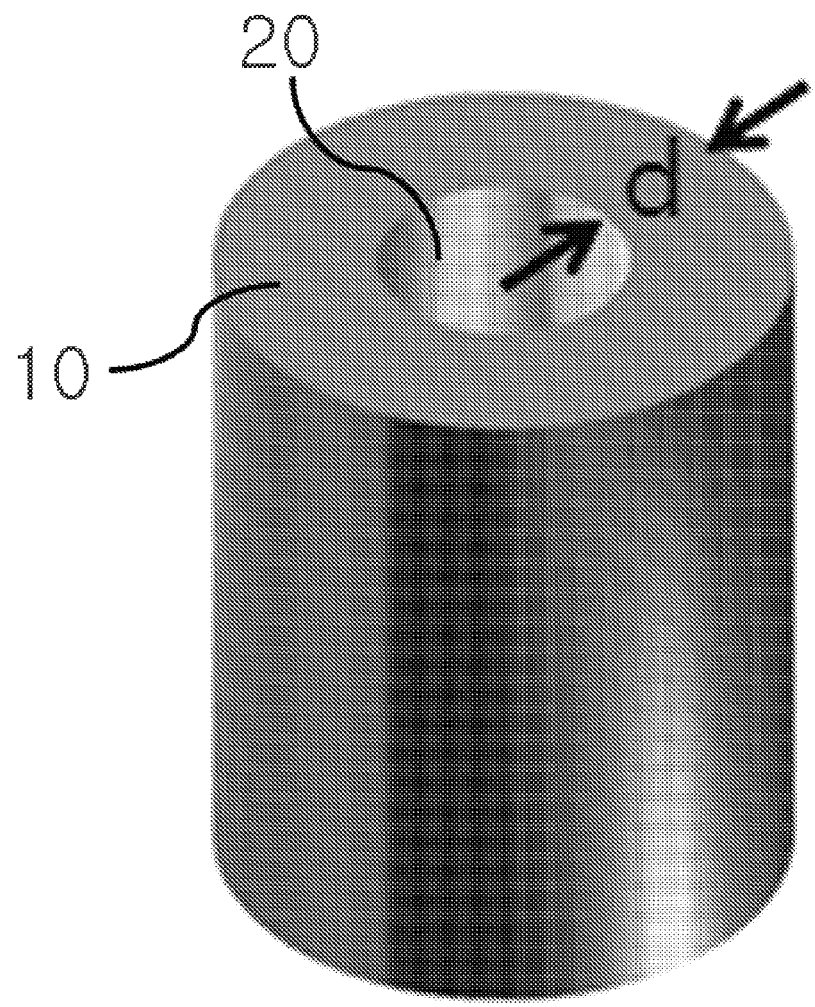
FIG. 2 shows a porous $UO_2$ sintered pellet having a hollow space therein according to the present invention.

Embodiments will be explained in detail with reference to a porous $UO_2$ sintered pellet in a cylindrical shape, as illustrated in FIG. 2.

Referring to FIG. 2, the porous $UO_2$ sintered pellet (10) according to an embodiment may be provided in a cylindrical shape, and may have hollow spaces (20) inwardly extending from a surface of the sintered pellet and passing through the center of the sintered pellet. Further, hollow spaces (20) may also be formed in a cylindrical shape, although not strictly limited thereto. The size of the hollow spaces may be adequately adjusted according to the porosity or the surface of the sintered pellet (10) or the speed of the reduction process.

Referring to FIG. 2, a reference character 'd' denotes the widen of the sintered pellet (10), or the size of the hollow space, which may be determined in advance. As a sintered pellet has a narrower width (d), the nuclear fission product is volatilized more easily during sintering, and furthermore, the infiltration passage for the electrolyte is shorter such that the electrolytic reduction can be done at a faster rate. However, when the width (d) of the sintered pellet is excessively narrow, the strength of the sintered pellet can deteriorate and the weight of the sintered pellet adapted for use in the electrolytic reduction can decrease. Accordingly, it is preferable that the size of the hollow space (20) be adjusted appropriately, so that the width (d) of the sintered pellet is adjusted appropriately, although the width (d) of the sintered pellet may not be limited to any specific numerical range. That is, the width (d) of the sintered pellet may be adequately adjusted by considering the economic aspect of the electrolytic reduction and strength of the sintered pellet.

Further, the present invention provides a method for fabricating a porous $UO_2$ sintered pellet with improved an electrolytic reduction efficiency, for introduction into an electrolytic process for recovery of metallic nuclear fuel, which may include the following steps: forming a powder containing $U_3O_8$ by oxidising spent nuclear fuel containing uranium dioxide ($UO_2$) (step 1), fabricating green pellets by compacting the powder formed in step 1 (step 2), in which the green pellets have hollow spaces formed therein, and fabricating $UO_2$ sintered pellets by sintering the green pellets fabricated in step 2 in an atmospheric gas, and reducing the same in a reducing atmosphere (step 3).

The method used for fabricating porous $UO_2$ sintered pellets according to an embodiment may include a step of terming powder containing $U_3O_8$ by oxidizing spent nuclear fuel containing $UO_2$ (step 1).

In step 1, the $U_3O_8$ powder, as the raw material to be used in the fabrication of the porous $UO_2$ sintered pellet, may be formed from the spent nuclear fuel containing $UO_2$, by oxidising the spent nuclear fuel containing $UO_2$ at 350 to 700° C. in an air atmosphere, however, considering the particle sizes of the oxidised powder and other various factors, the spent nuclear fuel containing $UO_2$ may preferably be oxidized at 400 to 500° C. If the spent nuclear fuel containing $UO_2$ is oxidized at a predetermined temperature in an oxidising atmosphere, the spent nuclear fuel is oxidized into $U_3O_8$, along which the density decreases and the volume expands. As a result, the pellets are powdered. If the oxidization in step 1 is performed at temperatures lower than 400° C., the time for oxidizing into $U_3O_8$ is lengthened, and it also takes a good deal at time until the spent fuel is extracted from the cladding tube. Further, if the oxidization in step 1 is performed at temperatures exceeding 500° C., owing to rapid $U_3O_8$ formation, controlling the particle size becomes difficult, and accordingly, coarse $U_3O_8$ particles appear.

According to the embodiment, the method used for fabricating porous $UO_2$ sintered pellets may include a step of fabricating green pellets by compacting the powder formed in step 1, in which the green pellets include hollow spaces formed therein (step 2).

As a result of the process in step 2, the green pellets are formed using the powder formed in step 1, with hollow spaces formed therein, and this process may be performed by a general method such as compacting. The compacting in step 2 may include pressing the powder into a mole designed to form the hollow spaces in the green pellets, but is not limited thereto. Accordingly, the compacting in step 2 may be performed using any method that can form the hollow spaces in the green pellets.

Meanwhile, the green pellets fabricated in the compacting in step 2 may preferably be formed into cylindrical or polygonal shapes to suit the follow-tip process, but are not limited thereto.

Further, the pressure for such compacting in step 2 may preferably range between 100 and 500 MPa. If the pressure for compacting is below 100 MPa, the powder is not compressed sufficiently, thus degrading the integrity. This may also cause a shortcoming of inconvenient transport to the next process and inconvenient handling during the process. If the compaction pressure exceeds 500 MPa, the compression by excessive pressure causes a high-density of green pellets, and accordingly, the fission products are less likely to volatilize from the green pellets during the sintering process. In the fabrication of the green pellets using the pressure explained above, it is possible to adequately control the porosity of the green pellets by appropriately controlling the compaction pressure, and according to the adequate control of the porosity, it is possible to facilitate the volatilization of the fission products in the sintering process of the follow-up process.

According to the embodiment, the method used for fabricating porous $UO_2$ sintered pellets may additionally include a step for homogenizing the powder formed in step 1, prior to performing the compacting in step 2, in which the 'homogenizing' as used herein refers to a homogenization of various matters contained in the powder formed in step 1.

The spent nuclear fuel ($UO_2$) from the PWR has an irregular burnup distribution which varies even in the same fuel assembly and fuel rod depending on the length. The variations in the burnup distribution can cause an irregular content distribution of the fissile material (U, TRU), and fission product, which are generated within the nuclear fuel, and further influence the microstructure of the nuclear fuel.

The size of the crystal grains of the microstructure of the nuclear fuel varies depending on the burnup or linear heat rating, and based on the burnup and in the direction from the edge to the center axis, the $UO_2$ sintered pellets can be divided into an undistributed area which is before the irradiation, equiaxed area, and columnar area. The varying particle sizes depending on the burnup also influence the particle size of the oxidized $U_3O_8$ powder, and the particle size of the oxidised powder also tends to increase, when the burnup increases.

Such difference in burnups, i.e., the inhomogeneous distribution of TRU concentration containing plutonium and an irregular particle size can affect the accuracy in the metric measurement of the nuclear fuel substances, which can greatly contribute to nuclear transparency. Without an accurate measurement of the nuclear fuel substances, it would be difficult to achieve a stability of the processing factors and reproducibility in the fabrication of porous $UO_2$ sintered pellets.

To prevent the above-mentioned shortcomings, the fabrication method according to an embodiment may additionally include a step for homogenising the powder containing $U_3O_8$ formed in step 1, and this may be controlled through a refining of the powder. That is, the homogeneity of the powder may be improved through the refining process and the homogeneity increases as the powder is more refined. Further, the homogenization can cause a regular concentration distribution of the fissile materials, which are variably present in the spent nuclear fuel. Furthermore, since the concentration distribution of the nuclear fission product present in the spent nuclear fuel is homogenized, the ability to capture nuclear fission products volatilizing in the sintering and reduction processes is improved, causing a constant degree of volatilization of the fission product. Accordingly, the effects such as an anticipatable degree of capture and reproducibility of the fabrication process of the sintered pellets are provided.

Meanwhile, when the homogenization is performed, the compacting an step 2 may be performed under a relatively lower pressure compared to when the powder does not undergo homogenization. This is because the homogenization causes refinement of the $U_3O_8$ powder and regularization of the size distribution of the particles. Accordingly, productivity increases, since sintered pellets with desired sintered density can be fabricated with relatively lower compaction pressure or sintering temperature than their conventional counterparts.

Meanwhile, the homogenisation may be performed through a process such as blending or milling. When the $U_3O_8$ powder termed in step 1 has irregular particle sizes, homogenization by blending may cause a problem such as segregation, and subsequently deteriorate the homogenization efficiency. Accordingly, the homogenization in step 2 may preferably be performed through millings, by which the particle sizes of the powder become similar to each other and the homogenisation efficiency increases. However, the homogenization in step 2 is not limited to the above example only. Accordingly, the particle size of the $U_3O_8$ powder formed in step 1 may be regularized, and the matter within the powder may be homogenized with adequately-selected means.

The milling may be performed using a ball mill, basket mill, attrition mill, bead mild, or hammer mill, but is not limited to any specific homogenization means.

The fabrication method of a porous $UO_2$ sintered pellet according to the embodiment may include a step 3 for forming a porous $UO_2$ sintered pellet by sintering the green pellet formed in step 2 in atmospheric gas and reducing the same in a reducing atmospheric gas.

Since powder containing $U_3O_8$ formed from spent nuclear fuel generally includes various kinds of semi-volatile and volatile fission products, considering the potential risk of a negative effect on the electrolytic reduction process wherein ceramic fuel is reduced into metallic nuclear fuel, it is preferable to vaporize the fission products during the pretreatment by heating at the appropriate temperature; it is also desirable to filter the vaporised fission product.

To remove the fission product, step 3 may include a step of sintering the $U_3O_8$ green pellets formed in step 2 at a temperature between 1000 and 1600° C., and removing, by vaporizing, the nuclear fission produce from the $U_3O_8$ green pellets through many pores that are generated during the sintering. The sintered pellet finished with the sintering in step 3 exists as $UO2+x$ ($0.01 \leq x \leq 0.67$), and the pellets after the sintering may be reduced in a seducing atmosphere to UO2. Accordingly, after the sintering and reducing in step 3, the green pellet formed in step 2 can be formed into a $UO_2$ pellet.

Meanwhile, the sintering and reducing in step 3 may be performed with methods generally applicable for the fabrication of porous $UO_2$ sintered pellets.

For example, the sintering of the green pellet formed in step may be performed in step 3 at 1000° C. to 1600° C., in an atmospheric gas, including air, carbon dioxide ($CO_2$), nitrogen ($N_2$), or argon (Ar). When the sintering is performed in an oxidizing gas atmosphere such as air or carbon dioxide, or in a nitrogen ($N_2$) gas atmosphere or inert gas atmosphere such as argon, the O/U ratio (ratio between oxygen elements and uranium elements) is adjustable according to the sintering temperature. Accordingly, the advantage of an easy removal of the fission products (which are single metal components) is provided.

In the sintering of green pellets in step 3, the sintering time may preferably be between 1 and 10 h. If the sintering time is less than 1 h, the mechanical strength of the sintered pellets is so weak that these can be broken even with a small shock, thus making the handling thereof inconvenient. If the sintering time exceeds 10 h, the pores within the sintered pellets are coarsely formed, and the coarsely formed pores are then not distributed uniformly in the pellet matrix.

The sintering in step 3 produces pellets in the form of $UO_{2+x}$ ($0.01 \leq x \leq 0.67$), and the presence of relatively more surplus oxygen in $UO_{2+x}$ can deteriorate the productivity mainly in terms of the efficiency of processing and throughput in the follow-up process, i.e., electrolytic reduction. Accordingly, the sintered pellet in $UO_{+x}$ ($0.01 \leq x \leq 0.67$) forms after sintering is reduced to $UO_2$, and to this purpose, the sintered pellet is reduced in a reducing atmospheric gas. The reduction process in step 3 allows the production of porous and high-quality $UO_2$ sintered pellets that have no defects such as cracks, and because the produced $UO_2$ sintered pellets have a 2.00 O/U ratio, the electrolytic reduction may be performed as the post-processing more easily. Further, non-vaporised fission product, which remains after the sintering of step 3, may be vaporized during the reduction.

The sintering and reduction of step 3 may be performed continuously or discontinuously.

When the sintering and reducing are performed continuously, the sintering atmospheric gas is changed into reducing atmospheric gas during cooling after the sintering for reducing purposes, by either maintaining the temperature of the sintering for a predetermined time since the change of the gas into a reducing atmospheric gas, or directly performing cooling.

That is, when the sintering and reducing are performed continuously, this means that hydrogen gas is introduced to change the atmosphere into a reducing atmosphere. As a result, the reduction may consecutively follow the sintering without interruption.

If the sintering is performed in an air atmosphere, oxidative atmospheric gas may be removed by introducing inert gas such as argon (Ar) first, and then hydrogen gas to create reducing atmosphere may preferably be introduced.

If the sintering is performed in an atmospheric gas such as carbon dioxide, nitrogen, or argon, the reducing atmosphere may be crested by directly introducing hydrogen gas, but is not limited thereto.

When the sintering and reducing in step 3 are performed discontinuously, the $UO_{2+x}$ sintered pellet, which is formed after the sintering, is cooled to room temperature and again reduced as 1000° C. to 1400° C. in a reducing atmosphere so that a porous $UO_2$ sintered pellet is formed.

When the sintering and reducing in step 3 are performed discontinuously, the sintered pellet finished with the sintering is cooled to room temperature and again reduced at 1000° C. to 1400° C. in a reducing atmosphere. While the continuous sintering and reducing can provide an advantage such as a reduced space for the processing, or processing within a shorter period of time, this also has a shortcoming in that analysis of the sintered pellet finished with the sintering is not possible, and thus the characteristics of the sintered pellet are not analysed or improved. Since the discontinuous sintering and reducing can involve an analysis of the characteristics of the sintered pellet, adequate control of the temperature for reducing can be provided by a characteristic analysis. As a result, the O/U ratio control of the porous $UO_2$ sintered pellet can be performed with increased ease. Further, when the sintering and reducing are performed discontinuously, filters for use in the sintering and reducing can be individually used, so that a problem associated with the use of the same filter in the sintering and reducing, i.e., a problem in which the fission product captured during sintering separates from the filter owing to a reaction in the reducing process, can be prevented.

For the discontinuous processing of the sintering and reducing, it is preferred that the reducing be performed for 1 to 10 hr. If the reducing is performed for less than 1 hr, reduction info $UO_2$ is not properly done so that $UO_{2+x}$ is formed instead, where as if the reduction exceeds 10 hr, the cost increases from an unnecessarily increased time consumption.

While the continuous or discontinuous sintering and reducing are explained above, these are only examples, and accordingly, a method for fabricating a porous $UO_2$ sintered pellet according to the present invention is not limited to any specific examples.

Before the sintering of step 3, a method for fabricating porous $UO_2$ sintered pellets in one embodiment may additionally include a step of step-wise heating the green pellets formed in step 2 up to the sintering temperature in consideration of the volatilization temperature of the fission product.

When the green pellets are step-wise heated to the sintering temperature, it is possible to collect fission products in which the fission product may be distinguished and collected in the respective temperature regions at which the volatile fission products are vaporised. The $U_3O_8$ powder formed from the spent nuclear fuel includes a variety of volatile and semi-volatile fission products existing therein, and these fission products vaporize at respectively different vaporization temperatures from each other. By way of example, iodine (I) and bromine (Br) vaporize at about 150° C., technetium (Tc), ruthenium (Ru), molybdenum (Mo), rhodium (Rh), tellurium (Te), or carbon (C) vaporize at about 800° C.; and cesium (Cs), rubidium (Rb) or cadmium (Cd) vaporize at about 1000° C. While heating the respective fission products with different vaporization temperatures up to the sintering temperature, it is possible to select and use suitable filters to collect the vaporizing fission products. Therefore, it is possible to more effectively collect the fission products vaporizing at the respective temperatures of heating until the sintering temperature using suitable filters, and it is also possible to treat the spent filters with the fission products collected thereat.

Meanwhile, the method for fabricating porous $UO_2$ sintered pellets according to the embodiment may also use raw powder including plutonium oxide ($PuO_2$), or gadolinium oxide ($Gd_2O_3$) in addition to nuclear fuel ($UO_2$), in which case the method can be implemented to produce nuclear fuel of low density such as $UO_2$—$PuO_2$, $UO_2$—$Gd_2O_3$, or the like, but the embodiment is not limited to any specific example.

An embodiment will be explained in greater detail below with, reference to Examples. However, the Examples are provided only for illustrative purposes, and therefore, an embodiment is not limited to the specific Examples explained below.

Example 1

Fabrication 1 of Porous $UO_2$ Sintered Pellets

Step 1: $U_3O_8$ powder was produced using unirradiated $UO_2$ sintered pellets, instead of irradiated uranium dioxide ($UO_2$) sintered pellets from a furnace. The unirradiated $UO_2$ sintered pellets exhibit approximately 96% theoretical density (T.D.) for the sintered density. The unirradiated $UO_2$ sintered pellets were oxidized at 450° C. in an air atmosphere for 4 h, and as a result of oxidation of $UO_2$ sintered pellets into $U_3O_8$, a density decrease and subsequent volume expansion, $U_3O_8$ powder was produced. The produced $U_3O_8$ powder has an average particle size of 10 μm, and a specific surface area of 0.53 $m^2/g$.

Step 2: The produced $U_3O_8$ powder was charged into press dies, and formed into cylindrical pellets (diameter: 10 mm, length: 12 mm, width (d): 2.5 mm, weight: about 4.1 g) with hollow spaces termed therein (see FIG. 2) under a compaction pressure of 300 MPa, with a deviation of the compaction pressure staying within 10 MPa.

Step 3: After compacting, the green pellets were placed in a zirconia ($ZrO_2$) boat, charged into a baton-type furnace and sintered in an air atmosphere. The sintering temperature (T) ranged between 1000° C. to 1400° C. (1000° C., 1100° C., 1200° C., 1300° C., 1400° C.), and was maintained for 2 h.

After the sintering, air was purged with argon (Ar) gas and substituted with hydrogen gas. After substitution with hydrogen, the green pellets finished with sintering were reduced by cooling.

When the sintering was performed at 1000° C., to have a 2.00 O/U ratio, air was substituted with hydrogen gas, sintering tempers sure was maintained for 2 hr, and a reduction was performed by cooling. When the sintering was performed at a temperature above 1000° C. (T>1000° C.), to have a 2.00 O/U ratio, air was substituted with a hydrogen gas, and reduction then directly followed by cooling, through which a porous $UO_2$ sintered pellet was fabricated.

The rate of temperature increase and decrease for the sintering and reduction was 4° C. per minute.

Example 2

Fabrication 2 of Porous $UO_2$ Sintered Pellets

A porous $UO_2$ sintered pellet was fabricated by almost same process as the one explained in Example 1, except that step 3 was performed as explained below after steps 1 and 2.

Step 3: The green pellets were placed in a zirconia ($ZrO_2$) boat, charged into a batch-type furnace and sintered in a $CO_2$ atmosphere. The sintering temperature (T) ranged between 1000° C. to 1400° C. (1000° C., 1100° C., 1200° C., 1300° C., 1400° C.), and was maintained for 2 h.

After the sintering, $CO_2$ was directly substituted with hydrogen for hydrogen reduction. After reduction in a hydrogen gas, the green pellets finished with sintering were reduced by cooling.

When the sintering was performed at 1000° C., to have a 2.00 O/U ratio, air was substituted with hydrogen gas, sintering temperature was maintained for 2 hr, and the reduction was performed by cooling. When the sintering was performed at a temperature above 1000° C. (T>1000° C.), to have a 2.00 O/U ratio, air was substituted with hydrogen gas, and reduction then directly followed by cooling, through which a porous $UO_2$ sintered pellet was fabricated.

The rate of temperature increase and decrease for the sintering and reduction was 4° C. per minute.

Example 3

Fabrication 3 of Porous $UO_2$ Sintered Pellets

Porous $UO_2$ sintered pellets were fabricated in the same manner as explained in Example 2, except that the sintering was performed in a nitrogen ($N_2$) atmosphere instead of $CO_2$ atmosphere in step 3.

Example 4

Fabrication 4 of Porous $UO_2$ Sintered Pellets

Porous $UO_2$ sintered pellets were fabricated in the same manner as explained in Example 2, except that the sintering was performed in an argon (Ar) atmosphere instead of $CO_2$ atmosphere in step 3.

Comparative Example 1

Porous $UO_2$ sintered pellets were fabricated in the same manner as explained in Example 1, except that the cylindrical green pellets were compacted in step 2 with no hollow spaces formed therein.

Comparative Example 2

Porous $UO_2$ sintered, pellets were fabricated in the same manner as explained in Example 2, except that the cylindrical green pellets were compacted in step 2 with no hollow spaces formed therein.

Comparative Example 3

Porous $UO_2$ sintered pellets were fabricated in the same manner as explained in Example 3, except that the cylindrical green pellets were compacted in step 2 with no hollow spaces formed therein.

Comparative Example 4

Porous $UO_2$ sintered pellets were fabricated in the same manner as explained in Example 4, except that the cylindrical green pellets were compacted in step 2 with no hollow spaces formed therein.

Experimental Example 1

Figure 3:
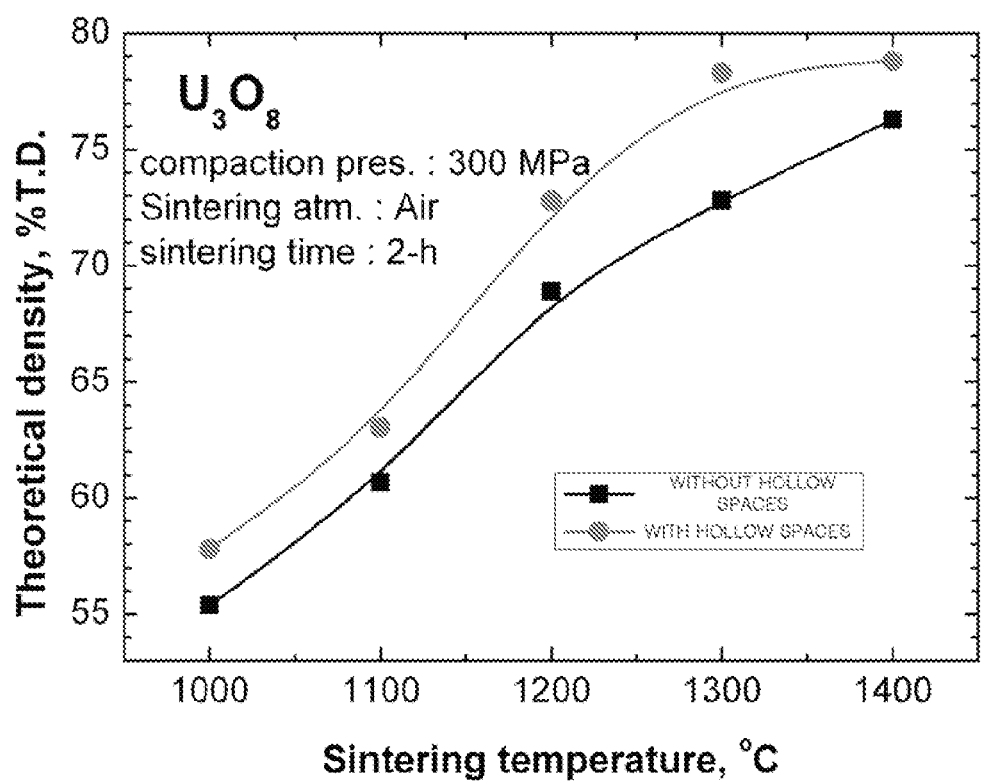
FIG. 3 is a graph plotting the sintered density according to the sintering temperature for a comparison between the porous $UO_2$ sintered pellets of Example 1 and the porous $UO_2$ sintered pellets of Comparative Example 1.

Density Analysis of Porous $UO_2$ Sintered Pellets (1) Analysis of Sintered Density of $UO_2$ Sintered Pellets in Air Atmosphere To analyze the densities of porous $UO_2$ sintered pellets fabricated in an air atmosphere according to Example 1 and Comparative Example 1, an immersion method was used to measure the densities and the results are presented in FIG. 3.

Referring to FIG. 3, an analysis of the porous $UO_2$ sintered pellets fabricated according to Example 1 and Comparative Example 1 revealed that the porous $UO_2$ sintered pellets with hollow spaces formed therein fabricated in Example 1 had a comparatively higher sintered density than the cylindrical sintered pellets of Comparative Example 1 over the entire sintering temperature region by approximately 2-5% T.D. From the above finding, it was shown that the sintered pellets with hollow spaces formed therein had a higher sintered density than the counterpart fabricated under the same sintering temperature condition, which thus compensates for the reduced weight of the sintered pellets owing to the presence of the hollow spaces to a certain extent.

Figure 4:
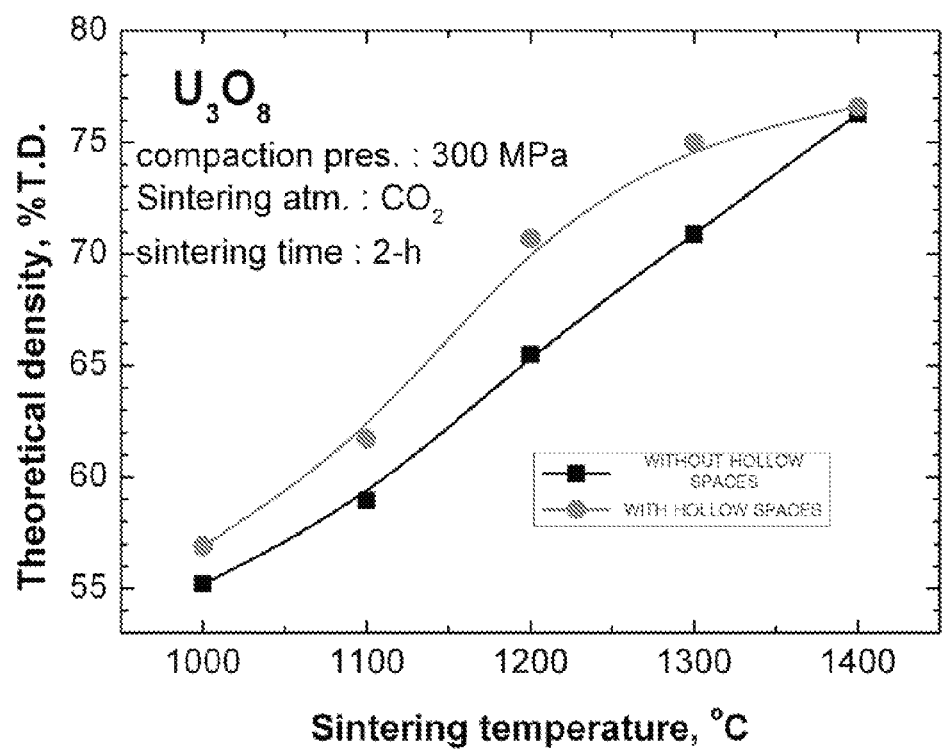
FIG. 4 is a graph plotting the sintered, density according to the sintering temperature for a comparison between the porous $UO_2$ sintered, pellets of Example 2 and the porous $UO_2$ sintered pellets of Comparative Example 2.

(2) Analysis of Sintered Density of $UO_2$ Sintered Pellets in a $CO_2$ Atmosphere To analyse the densities of porous $UO_2$ sintered pellets fabricated in a $CO_2$ atmosphere according to Example 2 and Comparative Example 2, an immersion method was used to measure the densities, and the results are presented in FIG. 4.

Referring to FIG. 4, analysis of the porous $UO_2$ sintered pellets fabricated according to Example 2 and Comparative Example 2 revealed that the porous $UO_2$ sintered pellets with hollow spaces formed therein fabricated in Example 2 had a comparatively higher sintered density than the cylindrical sintered pellets of Comparative Example 2 over the entire sintering temperature region by approximately 1-5% T.D. From the above finding, it was shown that the sintered pellets with hollow spaces formed therein had a higher sintered density than the counterpart fabricated under the same sintering temperature condition, which thus compensates for the seduced weight of the sintered pellets owing to the presence of the hollow spaces to a certain extent.

Figure 5:
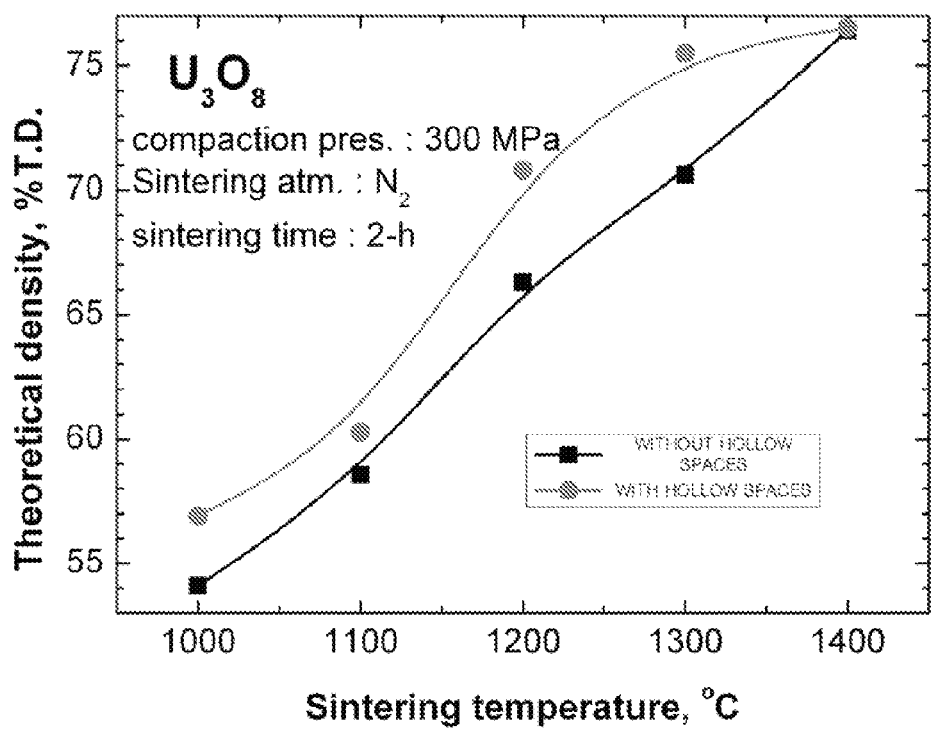
FIG. 5 is a graph plotting the sintered density according to the sintering temperature for a comparison between the porous $UO_2$ sintered pellets of Example 3 and the porous $UO_2$ sintered pellets of Comparative Example 3.

(3) Analysis of Sintered Density of $UO_2$ Sintered Pellets in a Nitrogen ($N_2$) Atmosphere To analyse the densities of porous $UO_2$ sintered pellets fabricated in a nitrogen ($N_2$) atmosphere according to Example 3 and Comparative Example 3, an immersion method was used to measure the densities, and the results are presented in FIG. 5.

Referring to FIG. 5, an analysis of the porous $UO_2$ sintered pellets fabricated according to Example 3 and Comparative Example 3 revealed that the porous $UO_2$ sintered pellets with hollow spaces formed therein fabricated in Example 3 had a comparatively higher sintered density than the cylindrical sintered pellets of Comparative Example 3 over the entire sintering temperature region by approximately 1-5% T.D. From the above findings, it was shown that the sintered pellets with hollow spaces formed therein had a higher sintered density than the counterpart fabricated under the same sintering temperature condition, which thus compensates for the reduced weight of the sintered pellets owing to the presence of the hollow spaces to a certain extent.

Figure 6:
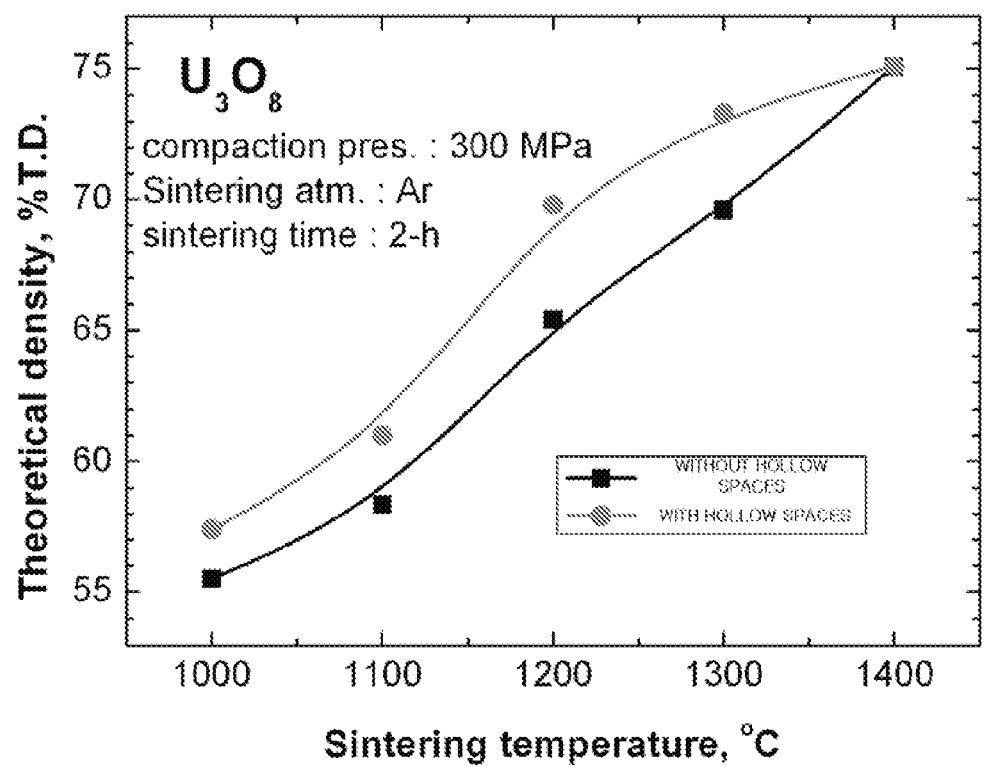
FIG. 6 is a graph plotting the sintered density according to the sintering temperature for a comparison between the porous $UO_2$ sintered pellets of Example 4 and the porous $UO_2$ sintered pellets of Comparative Example 4.
Figure 7:
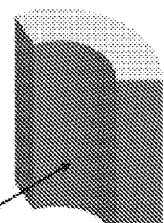
FIGS. 7 to 10 show SEM images of a fracture surface of porous $UO_2$ sintered pellets of Examples 1 to 4.
Figure 8:
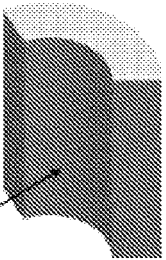
Figure 9:
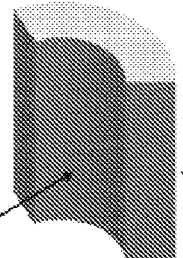
Figure 10:
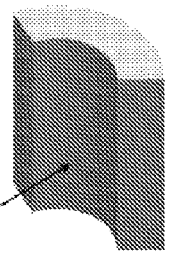

(4) Analysis of Sintered Density of $UO_2$ Sintered Pellets in an Argon (Ar) Atmosphere To analyse the densities of porous $UO_2$ sintered pellets fabricated in a $CO_2$ atmosphere according to Example 4 and Comparative Example 4, an immersion method was used to measure the densities and the results are presented in FIG. 6.

Referring to FIG. 6, an analysis of the porous $UO_2$ sintered, pellets fabricated according to Example 4 and Comparative Example 4 revealed that the porous $UO_2$ sintered pellets with hollow spaces formed therein fabricated in Example 4 had a comparatively higher sintered density than the cylindrical sintered pellets of Comparative Example 4 over the entire sintering temperature region by approximately 1-5% T.D. From the above findings, it was shown that the sintered pellets with hollow spaces formed therein had a higher sintered density than the counterpart fabricated under the same sintering temperature condition, which thus compensates for the reduced weight of the sintered pellets owing to the presence of the hollow spaces to a certain extent.

The above analysis results ail indicate that the porous $UO_2$ sintered pellets with hollow spaces formed therein according to the present invention had higher sintered densities than the sintered pellets without the hollow spaces formed in the same sintering temperature condition, and that this tendency continued even when the sintering temperature condition varied.

Experimental Example 2

Analysis of Porous $UO_2$ Sintered Pellets Using a Scanning Electron Microscope (SEM)

The fracture surfaces of the porous $UO_2$ sintered pellets fabricated according to Examples 1 through 4 were analyzed under a SEM, and the results are shown in FIGS. 7 through 10.

Referring to FIGS. 7 through 10, pores are present in the inner and outer circumferences of the porous $UO_2$ sintered pellets fabricated according to Examples 1 through 4, and the pores are connected to the interior of the sintered pellets to facilitate the infiltration of the electrolyte during the electrolytic reduction. That is, the porous $UO_2$ sintered pellets with hollow spaces according to the present invention have a large contact area with the electrolyte, and the presence of pores formed on the contact area facilitates the infiltration of the electrolyte. Further, since the distance for the electrolyte to travel into the sintered pellets through the pores is short, electrolytic reduction is anticipated to be performed at a faster speed.

Example 5

Fabrication 5 of Porous $UO_2$ Sintered Pellets

Step 1: $U_3O_8$ powder was produced using unirradiated $UO_2$ sintered pellets, instead of irradiated uranium dioxide ($UO_2$) sintered pellets from a furnace. The unirradiated $UO_2$ sintered pellets exhibited approximately a 96% theoretical density (T.D.) for the sintered density. The unirradiated $UO_2$ sintered pellets were oxidised at 450° C. in an air atmosphere for 4 h, and as a result of oxidation of $UO_2$ sintered pellets into $U_3O_8$, a density decrease and subsequent volume expansion, $U_3O_8$ powder was produced. The produced $U_3O_8$ powder has an average particle size of 10 μm, and a specific surface area of 0.53 m²/g.

Step 2: The $U_3O_8$ powder prepared in step 1 was homogenized by milling with a dynamic mill (KR Pat. No. 10-464537) for 1 to 8 hr (1, 2, 4, 8 hr). The average particle sire of the powder was approximately 1 μm after homogenization by milling for 1 hr or longer.

Step 3: The powder after homogenization in step 2 was charged into a press die and compacted into cylindrical green pellets (diameter: 10 mm, length: 8 mm, weight approximately 4 g) under pressure of 100, 300, and 500 MPa, with the deviation of the compaction pressure staying within 10 MPa.

Step 4: The green pellets were placed in a zirconia ($ZrO_2$) boat, charged into a batch-type furnace and sintered in an air atmosphere. The sintering temperature (T) ranged between 1000° C. to 1600° C. (1000° C., 1200° C., 1400° C., and 1600° C.), and was maintained for 2 h.

After the sintering, the air was purged with argon (Ar) gas and substituted with hydrogen gas. After substitution with hydrogen gas, the green pellets finished with sintering were reduced by cooling.

When the sintering was performed at 1000° C., to have a 2.00 O/U ratio, air was substituted with hydrogen gas, the sintering temperature was maintained for 2 hr, and the reduction was performed by cooling. When the sintering was performed as a temperature above 1000° C. (T>1000° C.), to have a 2.00 O/U ratio, the air was substituted with hydrogen gas, and reduction then directly followed by cooling. When the sintering was performed at 1600° C., the sintered pellets were cooled to 1000° C. in an Ar atmosphere, the atmosphere was substituted with hydrogen gas, the temperature was maintained at 1000° C. for 2 hr, and reduction then was performed by cooling, according to which the porous $UO_2$ sintered pellets were fabricated.

The rate of temperature increase and decrease for the sintering and reduction was 4° C. per minute.

Example 6

Fabrication 6 of Porous $UO_2$ Sintered Pellets

The porous $UO_2$ sintered pellets were fabricated in the same manner as Example 1 except for the differences in step 4 performed as follows.

Step 4: The green pellets were placed in a zirconia ($ZrO_2$) boat, charged into a batch-type furnace and sintered in a $CO_2$ atmosphere. The sintering temperature (T) ranged between 1000° C. to 1600° C. (1000° C., 1200° C., 1400° C., and 1600° C.), and was maintained for 2 h.

After the sintering, the $CO_2$ gas was directly substituted with hydrogen gas, and after the substitution with hydrogen gas, the green pellets finished wish sintering were reduced by cooling.

When the sintering was performed at 1000° C., to have a 2.00 O/U ratio, the air was substituted with hydrogen gas, the sintering temperature was maintained for 6 hr, and the reduction was performed by cooling. When the sintering was performed at a temperature above 1000° C. (T>1000° C.), to have a 2.00 O/U ratio, the air was substituted with hydrogen gas, and reduction then directly followed by cooling, according to which the porous $UO_2$ sintered pellets were fabricated.

The rate of temperature increase and decrease for the sintering and reduction was 4° C. per minute.

Example 7

Fabrication 7 of Porous $UO_2$ Sintered Pellets

Porous $UO_2$ sintered pellets were fabricated in the same manner as explained in Example 2, except that the sintering was performed in a nitrogen ($N_2$) atmosphere instead of a $CO_2$ atmosphere in step 4.

Example 8

Fabrication 8 of Porous $UO_2$ Sintered Pellets

Porous $UO_2$ sintered pellets were fabricated in the same manner as explained in Example 2, except that the sintering was performed in an argon (Ar) atmosphere instead of a $CO_2$ atmosphere in step 4.

Comparative Example 5

Porous $UO_2$ sintered pellets were fabricated in the same manner as explained in Example 5, except that the homogenization was not performed.

Comparative Example 6

Porous $UO_2$ sintered pellets were fabricated in the same manner as explained in Example 6, except that the homogenization was not performed.

Comparative Example 7

Porous $UO_2$ sintered pellets were fabricated in the same manner as explained in Example 7, except that the homogenization was not performed.

Comparative Example 8

Porous $UO_2$ sintered pellets were fabricated in the same manner as explained in Example 8, except that the homogenization was not performed.

Experimental Example 3

Analysis of the Characteristics of Homogenized Powder

To investigate the variations in the specific surface area depending on the milling time for homogenization, the specific surface area was analysed with a Micromeritics ASAP 2400, and the results are provided in Table 1 below.

|  | Milling time (hr) | | | | |
| --- | --- | --- | --- | --- | --- |
|  | 0 (no milling) | 1 | 2 | 3 | 4 |
| Specific surface area ($m^2/g$) | 0.53 | 1.94 | 2.44 | 2.56 | 2.39 |

Referring to Table 1, the specific surface area of the powder increased, but then decreased depending on the milling time for homogenization. The specific surface area was at its peak when the milling was performed for 4 hr, and milling longer than 8 hr appeared to be unnecessary. From the above finding, it was confirmed that the homogenization for 1 to 8 hr can increase the specific surface area of the powder fabricated according to the present invention.

Experimental Example 4

Analysis of the Green Density

Figure 11:
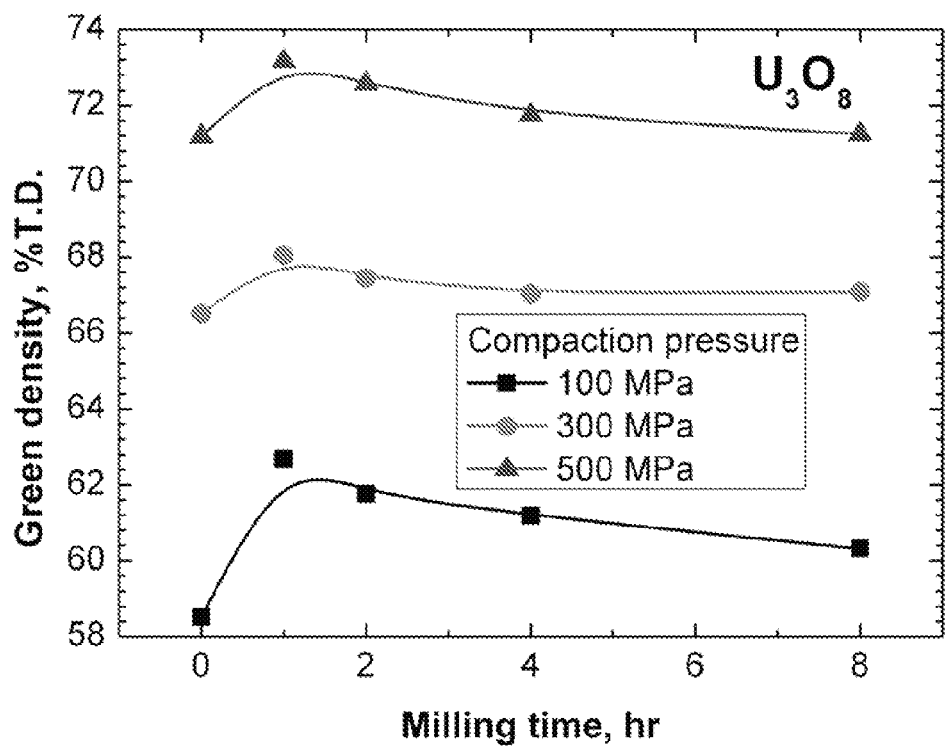
FIG. 11 is a graph plotting variations in the pressed density in accordance with variations in the duration of homogenization according to the fabrication method of the present invention.

To analyze the green density of the green pellets fabricated as a result of homogenization and compacting according to the fabrication method of the present invention, the density was measured using a geometrical method, and the results are shown in FIG. 11.

Referring to FIG. 11, the green density increased as the compaction pressure increased. Further, the green density reached maximum when the milling for homogenization was performed for 1 hr under each green pressure. Accordingly, it was confirmed that the homogenization according to the fabrication method of the present invention can influence the green density.

Experimental Example 5

Figure 12:
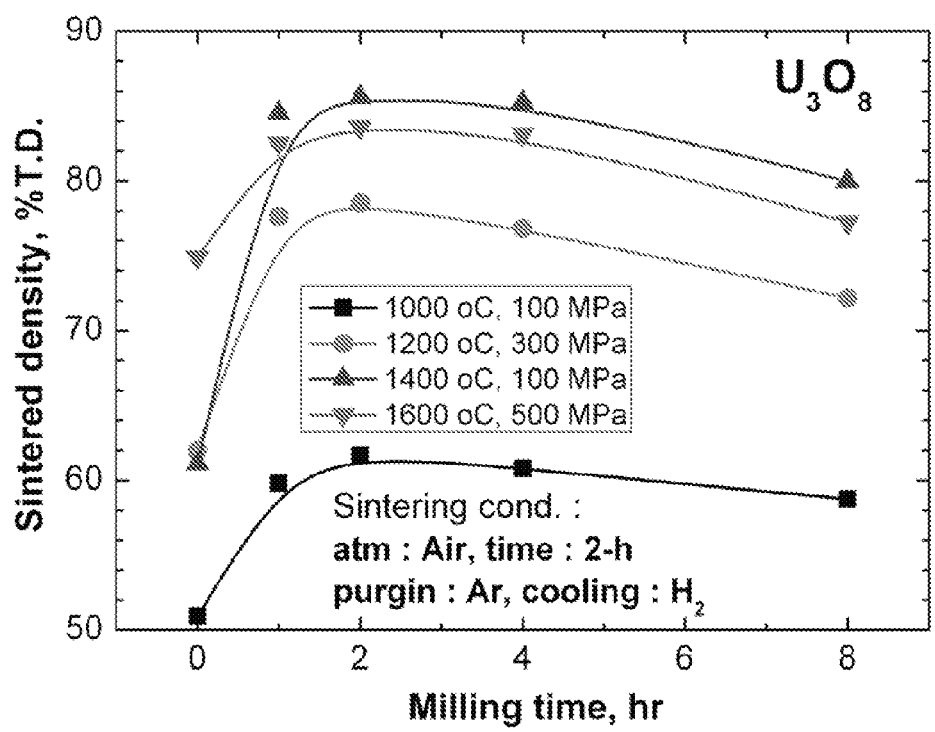
FIGS. 12 and 13 are graphs plotting the sintered density of the $UO_2$ sintered pellets of Example 5 and Comparative Example 5.
Figure 13:
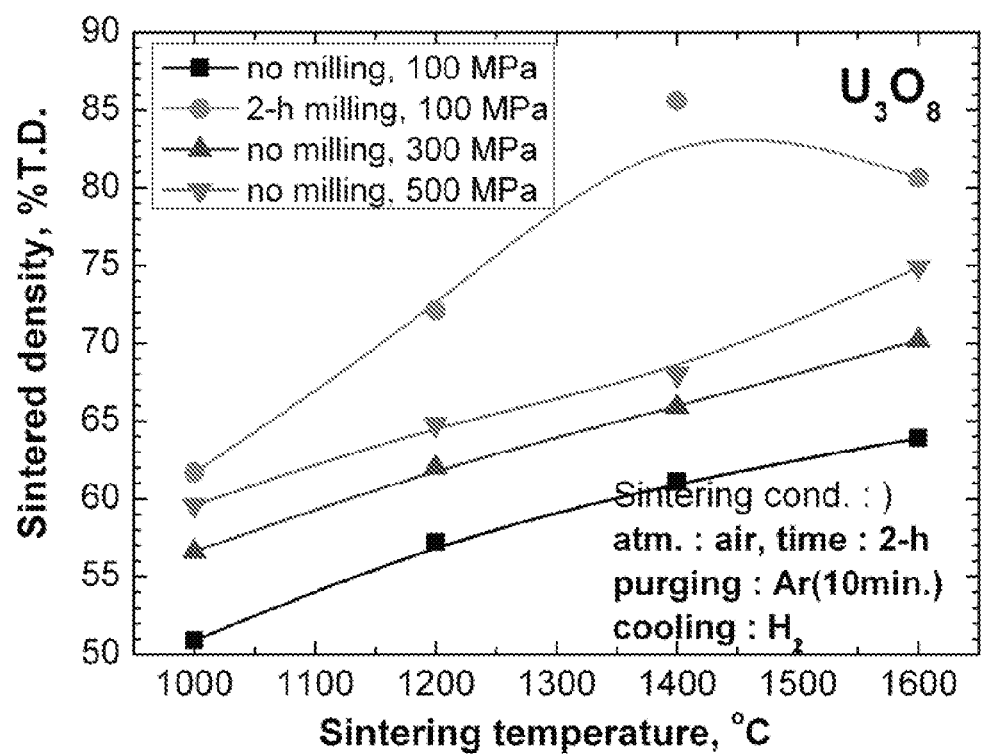

Analysis 2 of Sintered Density (1) Analysis of the Sintered Density of $UO_2$ Sintered Pellet when Sintered in an Air Atmosphere The sintered density of the $UO_2$ sintered pellets, which were sintered in an air atmosphere according to Example 5 and Comparative Example 5, was measured using an immersion method, and the results are shown in FIGS. 12 and 13.

Referring to FIG. 12, when sintering was performed under the same condition, the sintered density was higher when the milling for homogenization was performed. The maximum sintered density was reached when the milling for homogenization was performed for 2 hr.

Further, referring to FIG. 13, the powder, that underwent 2 hr milling for homogenization and compacting under 100 MPa had a higher sintered density than the unhomogenized powder that underwent no homogenization but compacting under a higher compaction pressure (500 MPa). Further, the sintered pellets formed from the homogenised powder, which underwent 2 hr milling, compacting under 100 MPa, and sintering at 1200° C., showed a greater sintered density than the sintered pellets formed from the unhomogenized powder, which underwent no homogenization, but compacting under higher pressure (500 MPa), and sintering at higher temperature (1400° C.). The above findings reveal that it is possible to fabricate $UO_2$ sintered pellets with a higher sintered density even under a lower compaction pressure and at lower sintering temperature, when the homogenisation is performed according to the fabrication method of the present invention, which thus confirms the high productivity and economic aspect of the fabricating method of the present invention.

Figure 14:
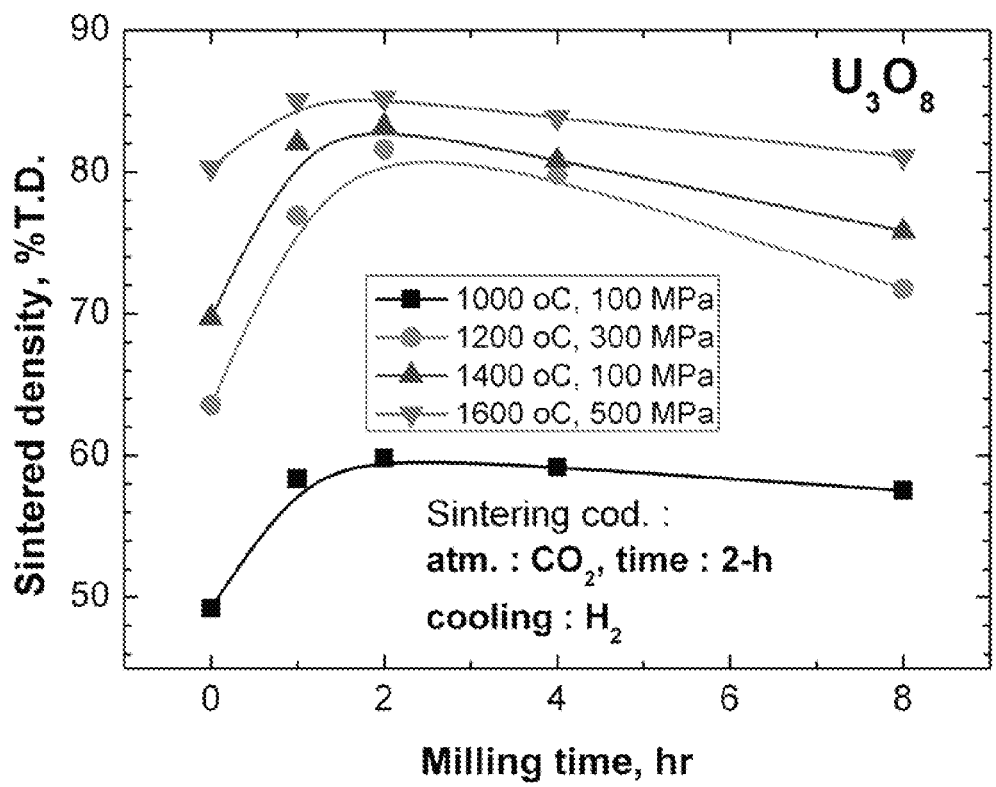
FIGS. 14 and 15 are graphs plotting the sintered density of the $UO_2$ sintered pellets of Example 6 and Comparative Example 6.
Figure 15:
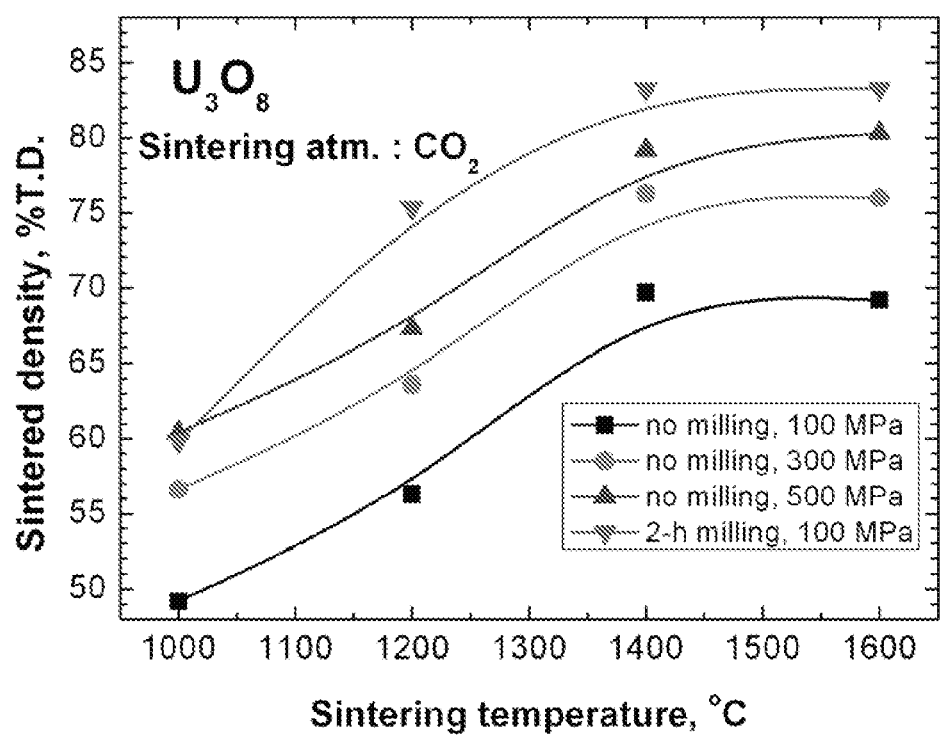

(2) Analysis of the Sintered Density of a $UO_2$ Sintered Pellet when Sintered in a $CO_2$ Atmosphere The sintered density of $UO_2$ sintered pellets, which were sintered in a $CO_2$ atmosphere according to Example 6 and Comparative Example 6 was measured using an immersion method, and the results are shown in FIGS. 14 and 15.

Referring to FIG. 14, when sintering was performed under the same condition, the sintered density was higher when the milling for homogenization was performed. The maximum sintered density was reached when the milling for homogenization was performed for 2 hr.

Further, referring to FIG. 15, the powder that underwent 2 hr milling for homogenization and compacting under 100 MPa had a higher sintered density than the unhomogenized powder which underwent no homogenization but compacting under higher compaction pressure (500 MPa). Further, the sintered pellets formed from the homogenised powder, that underwent 2 hr milling, compacting under 100 MPa, and sintering at 1200° C., showed a greater sintered density than the sintered pellets formed from the unhomogenized powder, which underwent no homogenization, but compacting under higher pressure (500 MPa) and sintering ac higher temperature (1400° C.). The above findings reveal that it is possible to fabricate $UO_2$ sintered pellets with a higher sintered density even under a lower compaction pressure, and lower sintering temperature, when the homogenization is performed according to the fabrication method of the present invention, and thus confirms the high productivity and economic aspect of the fabricating method of the present invention.

Figure 16:
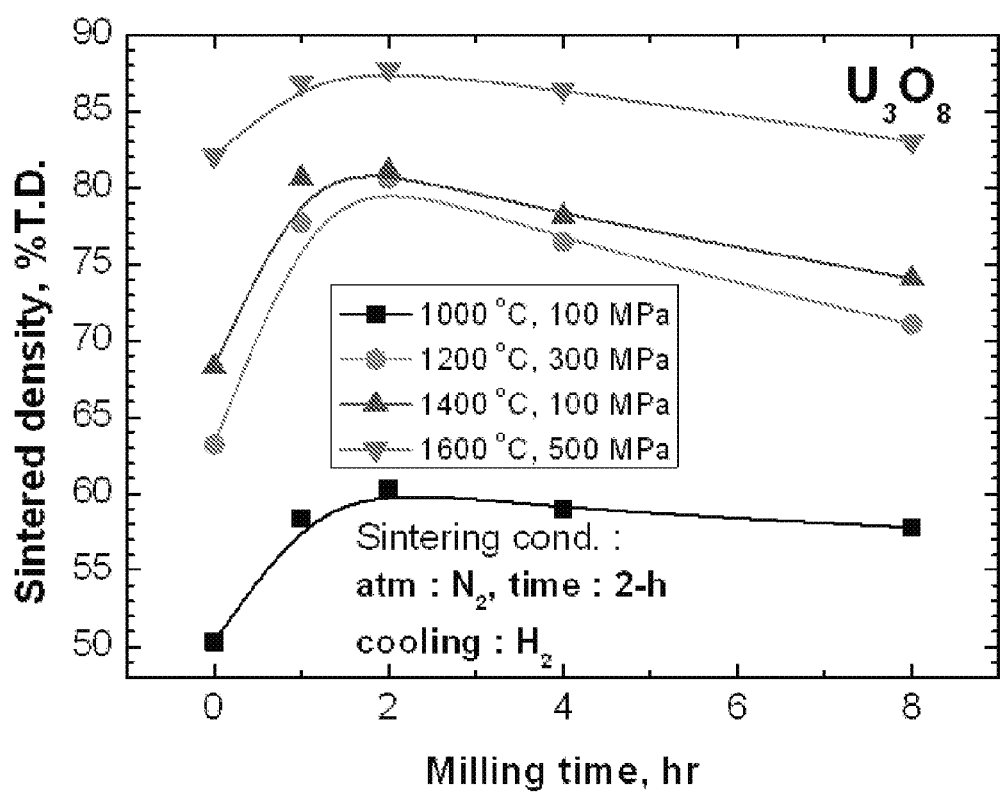
FIGS. 16 and 17 are graphs plotting the sintered density of the $UO_2$ sintered pellets of Example 7 and Comparative Example 7.
Figure 17:
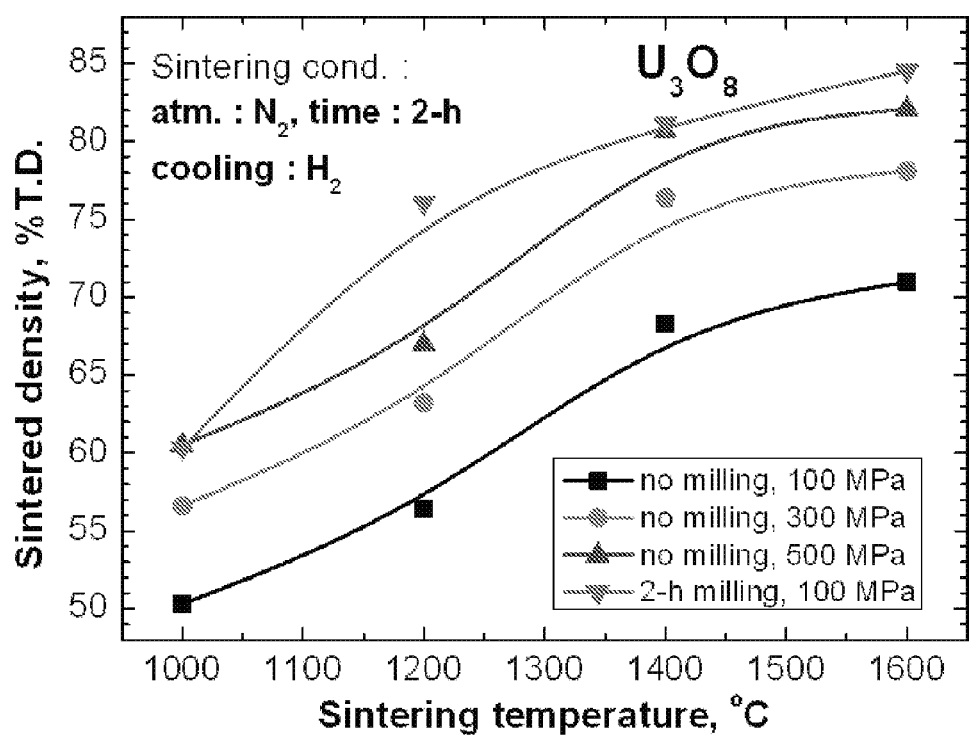

(3) Analysis of the Sintered Density of a $UO_2$ Sintered Pellet when Sintered in a Nitrogen ($N_2$) Atmosphere The sintered density of the $UO_2$ sintered pellets, which were sintered in a nitrogen ($N_2$) atmosphere according to Example 7 and Comparative Example 7 was measured using an immersion method, and the results are shown in FIGS. 16 and 17.

Referring to FIG. 16, when sintering was performed under the same condition, the sintered density was higher when the milling for homogenization was performed. The maximum sintered density was reached when the milling for homogenisation was performed for 2 hr.

Further, referring to FIG. 17, the powder that underwent 2 hr milling for homogenisation and compacting under 100 MPa had a higher sintered density than the unhomogenized powder that underwent no homogenisation but compacting under higher compaction pressure (500 MPa). Further, the sintered pellets formed from the homogenized powder, which underwent 2 hr milling, compacting under 100 MPa and sintering at 1200° C., showed a greater sintered density than the sintered pellets formed from the unhomogenized powder, which underwent no homogenization, but compacting under higher pressure (500 MPa) and sintering at higher temperature (1400° C.). The above findings reveal that it is possible to fabricate $UO_2$ sintered pellets with a higher sintered density even under a lower compaction pressure and at a lower sintering temperature when the homogenisation is performed according to the fabrication method of the present invention, thereby confirming the high productivity and economic aspect of the fabricating method of the present invention.

Figure 18:
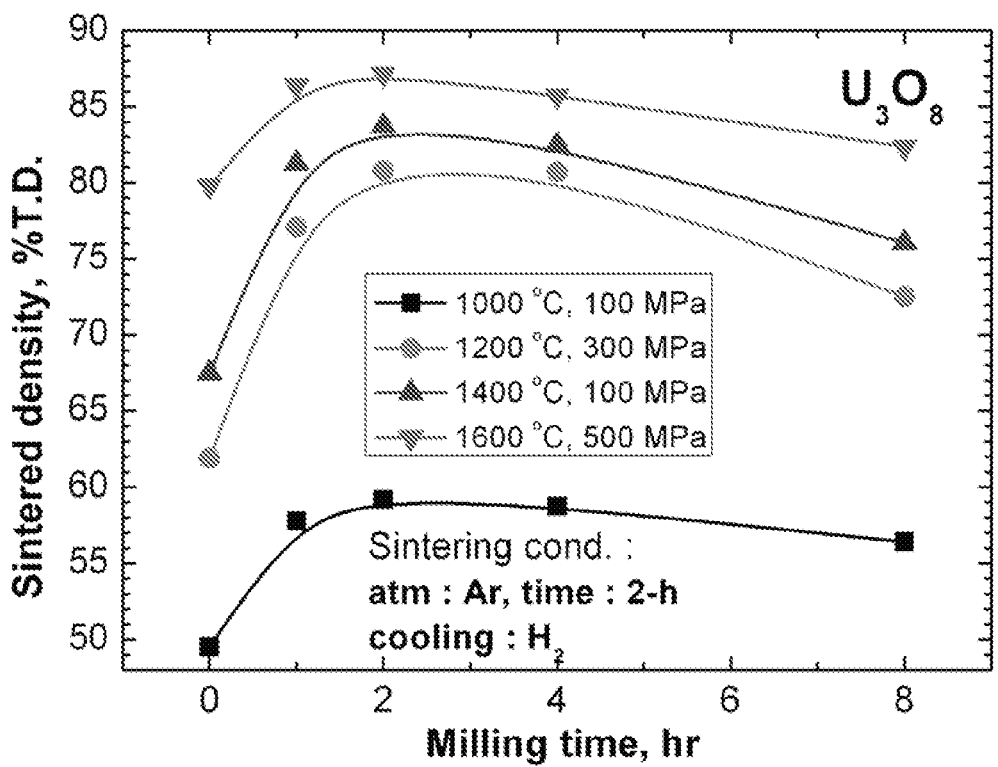
FIGS. 18 and 19 are graphs plotting the sintered density of the $UO_2$ sintered pellets of Example 8 and Comparative Example 8.
Figure 19:
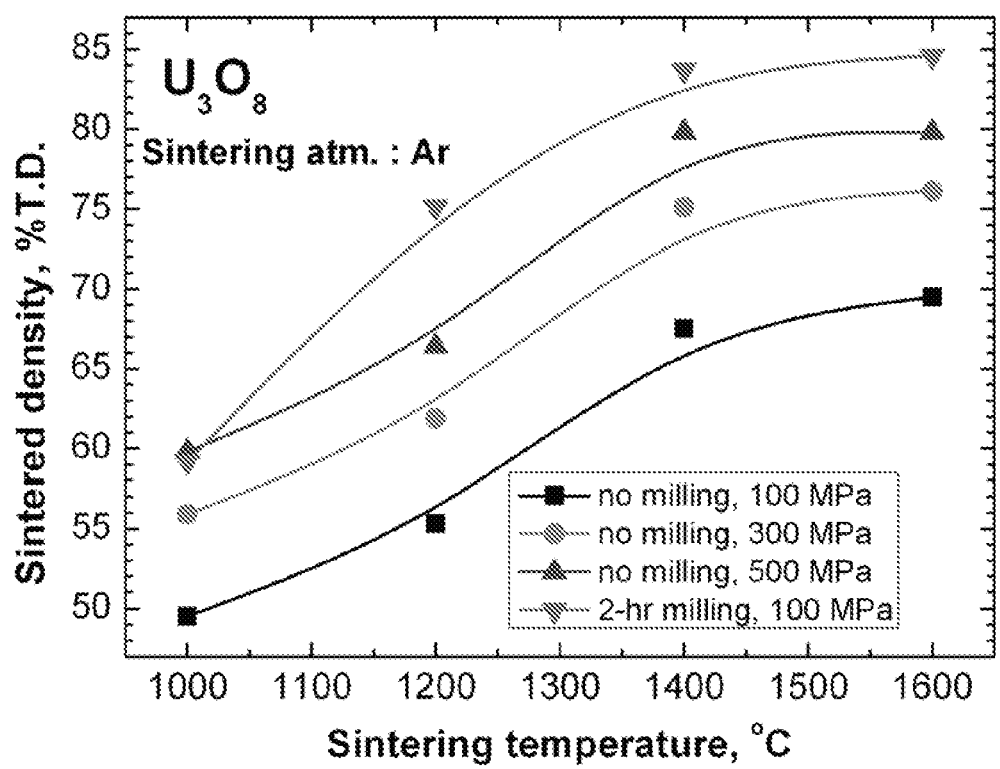
Figure 20:
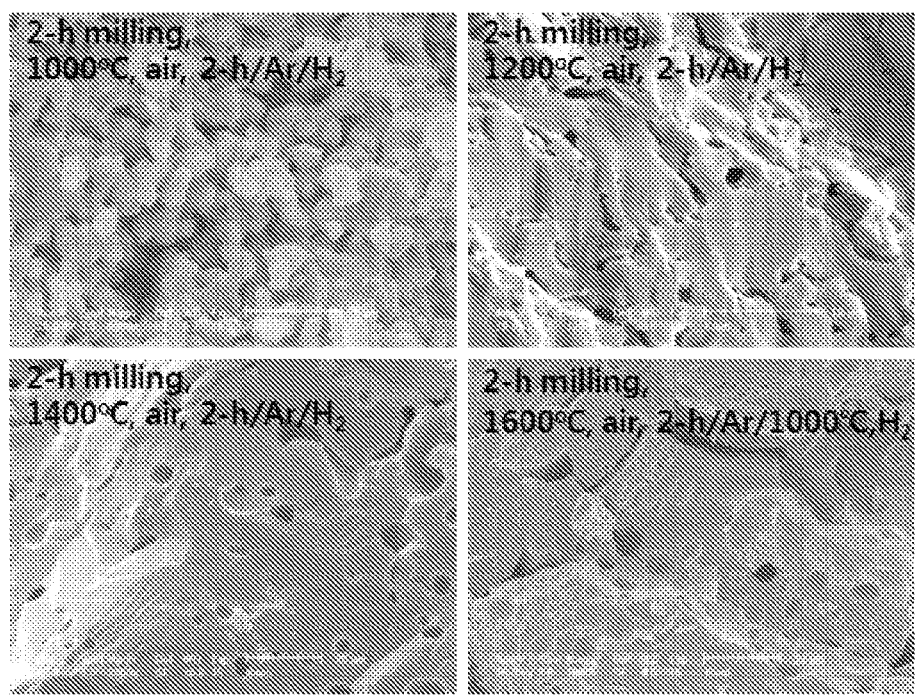
FIGS. 20 and 21 are SEM images of the $UO_2$ sintered pellets of Example 5 and Comparative Example 5.
Figure 21:
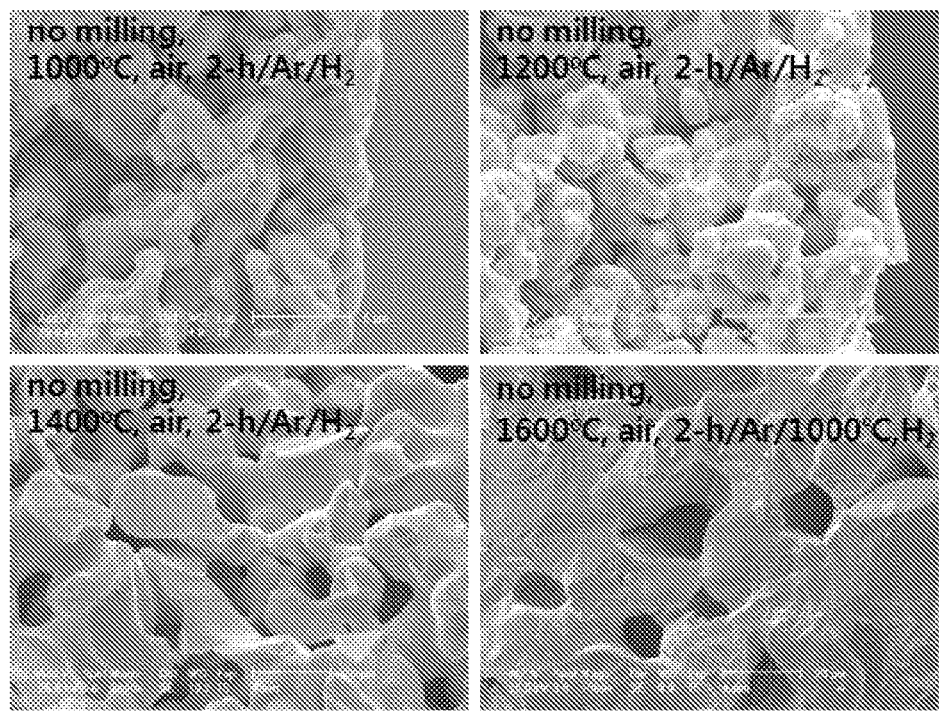
Figure 22:
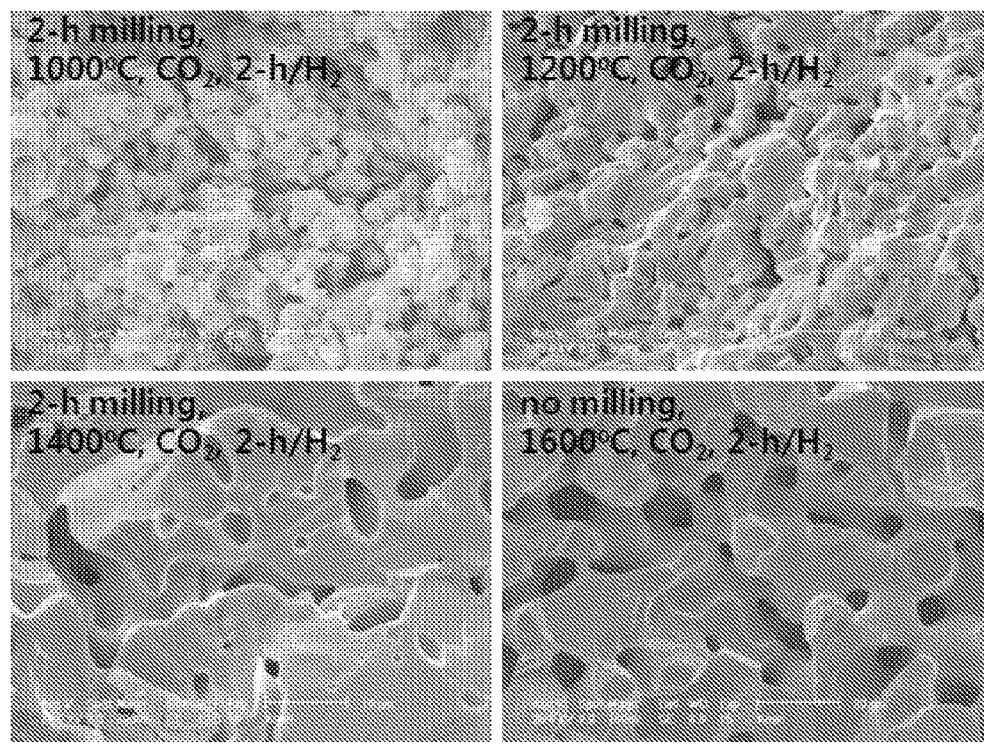
FIGS. 22 and 23 are SEM images of the $UO_2$ sintered pellets of Example 6 and Comparative Example 6.
Figure 23:
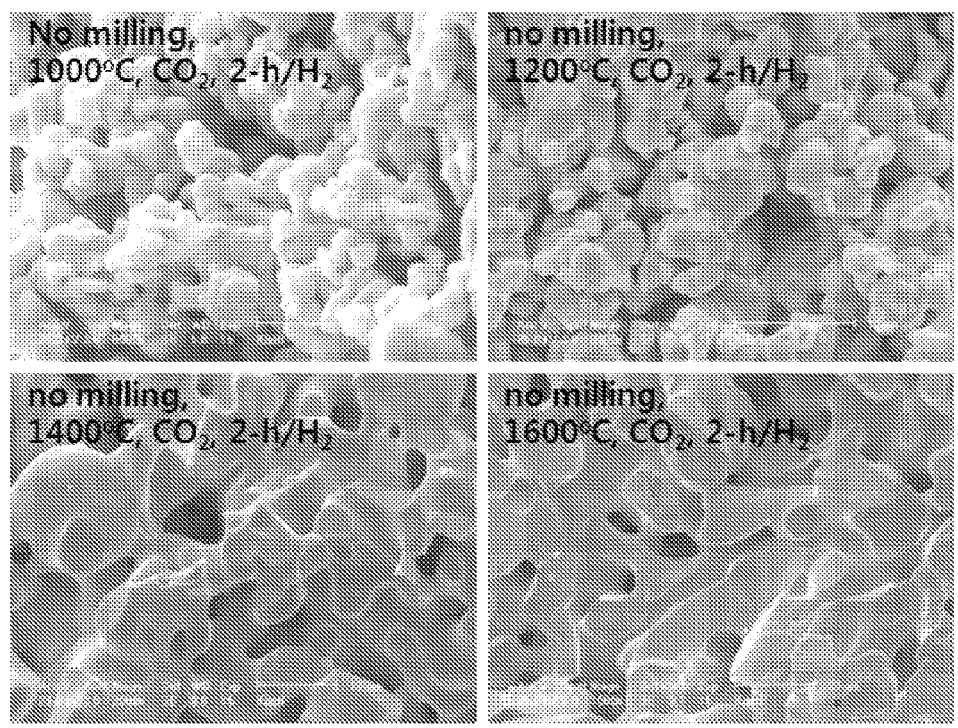
Figure 24:
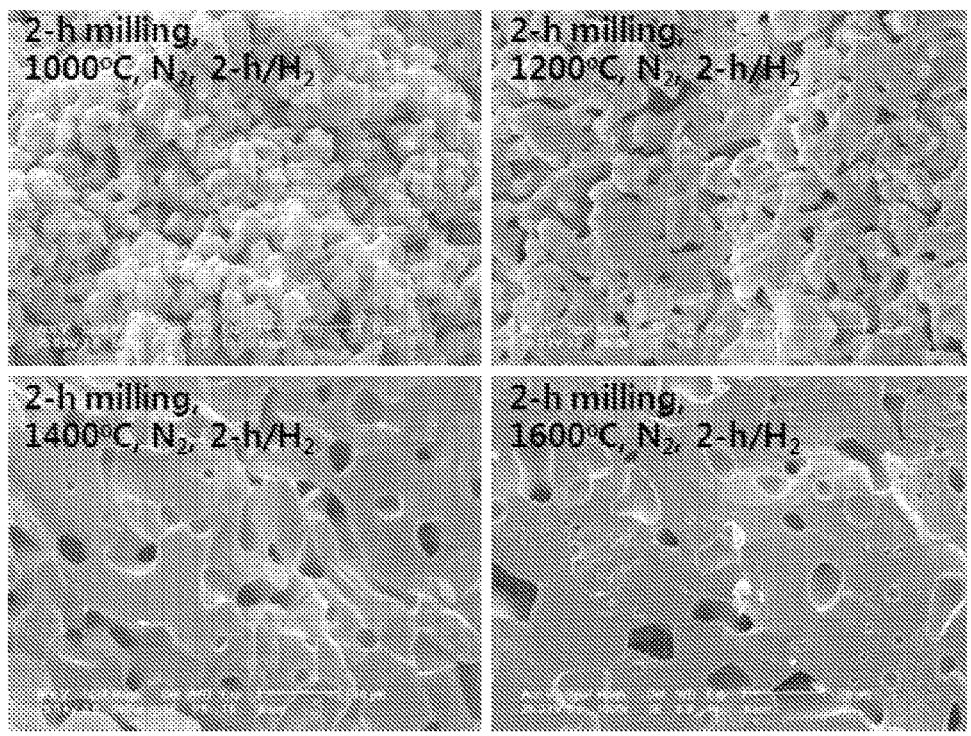
FIGS. 24 and 25 are SEM images of the $UO_2$ sintered pellets of Example 7 and Comparative Example 7.
Figure 25:
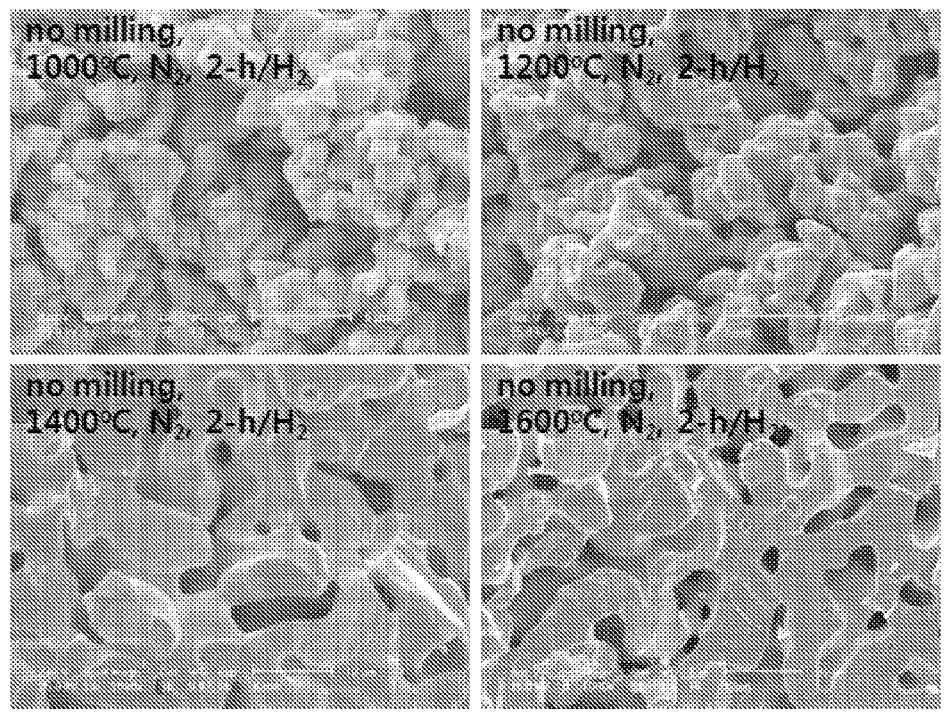
Figure 26:
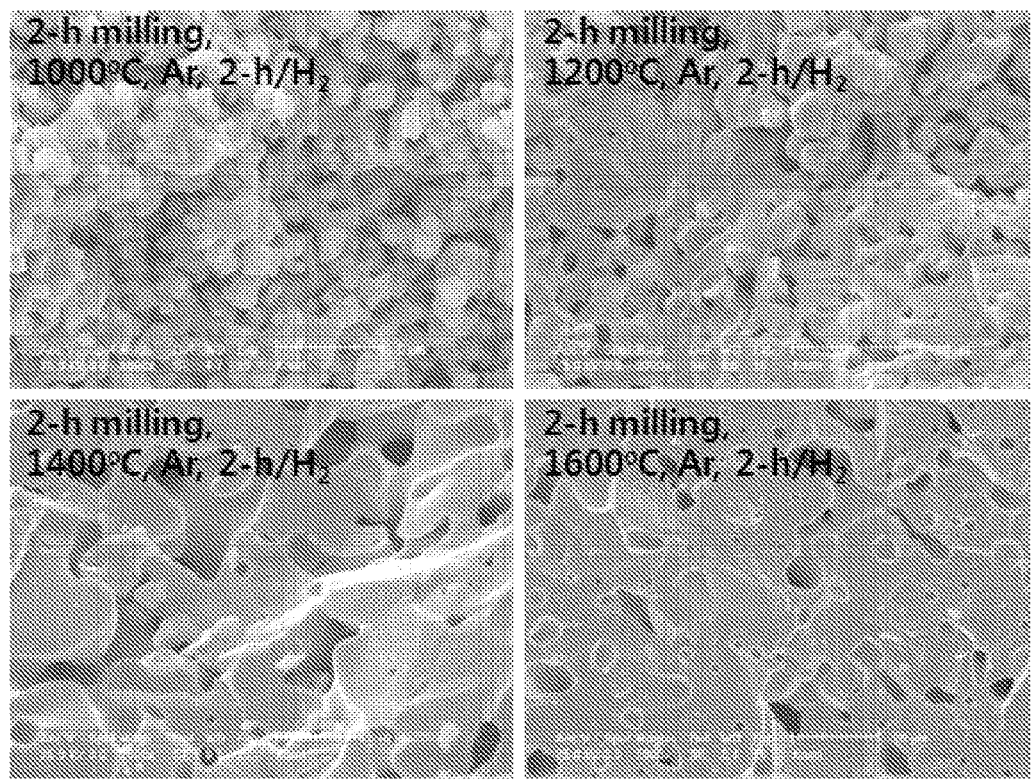
FIGS. 26 and 27 are SEM images of the $UO_2$ sintered pellets of Example 8 and Comparative Example 8.
Figure 27:
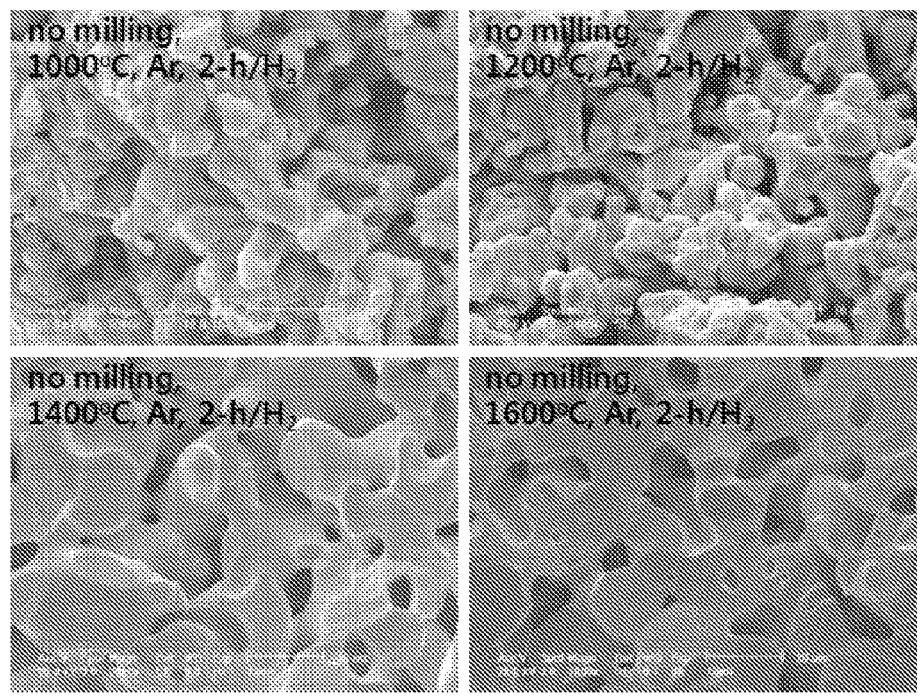

(4) Analysis of the Sintered Density of a $UO_2$ Sintered Pellet when Sintered in an Argon (Ar) Atmosphere The sintered density of $UO_2$ sintered pellets, which were sintered in an argon (Ar) atmosphere according to Example 8 and Comparative Example 8 was measured using an immersion method, and the results are shown in FIGS. 18 and 19.

Referring to FIG. 18, when sintering was performed under the same condition, the sintered density was higher when the mailing for homogenization was performed than not. The maximum sintered density was reached when the milling for homogenization was performed for 2 hr.

Further, referring to FIG. 19, the powder that underwent 2 hr milling for homogenization and compacting under 100 MPa had a higher sintered density than the unhomogenized powder that underwent no homogenization but compacting under a higher compaction pressure (500 MPa). Further, the sintered pellets formed from the homogenized powder, that underwent 2 hr milling, compacting under 100 MPa, and sintering at 1200° C., showed a greater sintered density than the sintered pellets formed from the unhomogenized powder, that underwent no homogenization, but compacting under a higher pressure (500 MPa), and sintering at a higher temperature (1400° C.). The above findings reveal that it is possible to fabricate $UO_2$ sintered pellets with a higher sintered density even under a lower compaction pressure and at a lower sintering temperature when the homogenization is performed according to the fabrication method of the present invention, thus confirming the high productivity and economic aspect of the fabricating method of the present invention.

The above analysis shows that it is possible to fabricate $UO_2$ sintered pellets with a high sintered density even under a relatively lower compaction pressure and at a lower sintering temperature, when homogenization is performed according to the fabrication method of the present invention, and that such tendency continues even when the sintering condition varies. Accordingly, it is predictable that the homogenization can bring about this effect even when applied to a conventional general sintering and reducing processes.

Experimental Example 6

Analysis of the $UO_2$ Sintered Pellets with a SEM $UO_2$ sintered pellets fabricated according to Examples 5 to 8 with powder that underwent milling for homogenization for 2 hr and then homogenization, and $UO_2$ sintered pellets fabricated according to Examples 5 through 8 with powder that underwent no homogenization but compacting under 100 MPa, were analyzed under SEM and the results are shown in FIGS. 20 through 27.

Referring to FIGS. 20 through 27, when sintering was performed at 1000° C., the particle size decreased when the milling for homogenization was performed, compared to when the homogenization was not performed. Meanwhile, when the sintering was performed at a temperature above 1200° C., the sintered pellets fabricated without homogenization had growing particles as the sintering temperature increased, and bonding among the particles also appeared. On the contrary, when the milling for homogenisation was performed, the bonding was made entirely rather than among particles, with pores formed therein. As the sintering temperature increased, the pores within the structure were larger and more rounded. The above is attributable to the facilitated bonding among the particles, which became finer by the homogenization performed according to the fabrication method of the present invention. It is also possible to anticipate that the semi-volatile and volatile fission products can easily vaporize through the pores.

While the present invention has been described with references to show it, embodiments thereof, it will be understood by those skilled in the art that various changes in form and details may be made therein without departing from the spirit and scope of the invention as defined by the appended claims.

What is claimed is:

1. A method for fabricating porous $UO_2$ sintered pellets to be fed into an electrolytic reduction process for the purpose of metallic nuclear fuel recovery, the porous $UO_2$ sintered pellets having one or more hollow spaces formed in a surface of the pellets, the one or more, hollow spaces extending inwardly from the surface toward interiors thereof, the method comprising the steps of:
    forming a powder containing $U_3O_8$ by oxidizing spent nuclear fuel containing uranium dioxide ($UO_2$) (step 1);
    compacting the powder formed in step 1 into green pellets with hollow spaces formed therein (step 2);
    fabricating $UO_{2+x}$ sintered pellets by sintering the porous $U_3O_8$ green pellets fabricated in step 2 at 1200 to 1600° C., in an atmospheric gas (step 3); and
    forming $UO_2$ sintered pellets by cooling the $UO_{2+x}$ sintered pellets in step 3 to room temperature, and reducing the same at 1000 to 1400° C., in a reducing atmosphere (step 4).

2. A method for fabricating porous $UO_2$ sintered pellets to be fed into an electrolytic reduction process for the purpose of metallic nuclear fuel recovery, the porous $UO_2$ sintered pellets having one or more hollow spaces formed in a surface of the pellets, the one or more, hollow spaces extending inwardly from the surface toward interiors thereof, the method comprising the steps of:
    forming a powder containing $U_3O_8$ by oxidizing spent nuclear fuel containing uranium dioxide ($UO_2$) (step 1);
    compacting the powder formed in step 1 into green pellets with hollow spaces formed therein (step 2); and
    fabricating $UO_2$ sintered pellets by sintering the $U_3O_8$ green pellets fabricated in step 2 at 1000 to 1600° C., in an atmospheric gas, and cooling the same for reduction, by changing the atmosphere to a reducing atmospheric gas (step 3).

3. The method as set forth in claim 2, further comprising a step of homogenizing the powder formed in step 1 prior to compacting the powder in step 2.

4. The method as set forth in claim 3, wherein the homogenizing is performed by milling.

5. The method as set forth in claim 4, wherein the milling is performed with a mill selected from a group consisting of a dynamic mill, ball mill, basket mill, attrition mill, bead mill, and hammer mill.

6. The method as set forth in claim 2, wherein the oxidizing is performed in an oxidizing atmosphere at a temperature ranging between 400° C. and 500° C.

7. The method as set forth in claim 2, wherein the green pellet is compacted under compaction pressure ranging between 100 and 500 MPa.

8. The method as set forth in claim 2, prior to the sintering, further comprising capturing of a nuclear fission product by step-wise heating the compacted green pellets to a sintering temperature.

9. The method as set forth in claim 1, further comprising a step of homogenizing the powder formed in step 1 prior to compacting the powder in step 2.

10. The method as set forth in claim 9, wherein the homogenizing is performed by milling.

11. The method as set forth in claim 10, wherein the milling is performed with a mill selected from a group consisting of a dynamic mill, ball mill, basket mill, attrition mill, bead mill, and hammer mill.

12. The method as set forth in claim 1, wherein the oxidizing is performed in an oxidizing atmosphere at a temperature ranging between 400° C. and 500° C.

13. The method as set forth in claim 1, wherein the green pellets are compacted under compaction pressure ranging between 100 and 500 MPa.

14. The method as set forth in claim 1, prior to the sintering, further comprising capturing of a nuclear fission product by step-wise heating the compacted green pellets to a sintering temperature.

15. The method as set forth in claim 1, wherein the porous $UO_2$ sintered pellet is configured in a shape of a cylindrical or polygonal pillar.

16. The method as set forth in claim 1, wherein the one or more hollow spaces pass through the porous $UO_2$ sintered pellet in a lengthwise direction.

17. The method as set forth in claim 2, wherein the porous $UO_2$ sintered pellet is configured in a shape of a cylindrical or polygonal pillar.

18. The method as set forth in claim 2, wherein the one or more hollow spaces pass through the porous $UO_2$ sintered pellet in a lengthwise direction.

* * * * *